US011649347B2

(12) United States Patent
Balan

(10) Patent No.: US 11,649,347 B2
(45) Date of Patent: May 16, 2023

(54) IMPACT MODIFIED COPOLYMERS OF (METH)ACRYLATE ESTERS AND/OR FREE RADICALLY POLYMERIZABLE MONOMERS CONTAINING NUCLEOPHILIC GROUPS

(71) Applicant: TRINSEO EUROPE GMBH, Horgen (CH)

(72) Inventor: Abidin Balan, Breda (NL)

(73) Assignee: TRINSEO EUROPE GMBH, Horgen (CH)

( * ) Notice: Subject to any disclaimer, the term of this patent is extended or adjusted under 35 U.S.C. 154(b) by 0 days.

(21) Appl. No.: 17/766,332

(22) PCT Filed: Oct. 6, 2020

(86) PCT No.: PCT/EP2020/077937
§ 371 (c)(1),
(2) Date: Apr. 4, 2022

(87) PCT Pub. No.: WO2021/069409
PCT Pub. Date: Apr. 15, 2021

(65) Prior Publication Data
US 2023/0036706 A1    Feb. 2, 2023

(30) Foreign Application Priority Data
Oct. 8, 2019 (EP) ..................... 19201904

(51) Int. Cl.
C08L 33/12    (2006.01)
C08L 33/24    (2006.01)

(52) U.S. Cl.
CPC .............. C08L 33/12 (2013.01); C08L 33/24 (2013.01); C08L 2205/03 (2013.01); C08L 2207/04 (2013.01)

(58) Field of Classification Search
CPC ........... C08L 2205/03; C08L 33/08–12; C08L 2207/04
See application file for complete search history.

(56) References Cited

U.S. PATENT DOCUMENTS

| | | |
|---|---|---|
| 2,727,884 A | 12/1955 | McDonald |
| 3,243,481 A | 3/1966 | Ruffing |
| 3,322,734 A | 5/1967 | Rees et al. |
| 3,536,788 A | 10/1970 | Hurwitz |
| 3,660,535 A | 5/1972 | Finch |
| 3,681,298 A | 8/1972 | Hurwitz |
| 3,681,475 A | 8/1972 | Spilner |
| 4,239,863 A | 12/1980 | Bredeweg |
| 4,572,819 A | 2/1986 | Priddy et al. |
| 4,585,825 A | 4/1986 | Wesselmann |
| 4,666,987 A | 5/1987 | Burmester et al. |
| 4,906,699 A | 3/1990 | Siol et al. |
| 5,091,477 A | 2/1992 | Bueschl et al. |
| 5,308,894 A | 5/1994 | Laughner |
| 5,314,953 A | 5/1994 | Corcoran et al. |
| 5,412,036 A | 5/1995 | Traugott et al. |
| 5,430,101 A * | 7/1995 | Minematsu ............. C08L 25/12 525/73 |
| 5,446,103 A | 8/1995 | Traugott et al. |
| 5,473,031 A | 12/1995 | Tinetti et al. |
| 5,663,252 A | 9/1997 | Pike et al. |
| 6,214,945 B1 | 4/2001 | Pike et al. |
| 6,605,681 B1 | 8/2003 | Villalobos et al. |
| 7,119,152 B1 | 10/2006 | Lacroix et al. |
| 8,314,193 B2 | 11/2012 | Reimers et al. |
| 8,642,696 B2 | 2/2014 | Hayes |
| 8,889,783 B2 | 11/2014 | Hayes |
| 10,100,216 B2 | 10/2018 | Chao et al. |
| 2005/0182186 A1 | 8/2005 | Gielens et al. |

(Continued)

FOREIGN PATENT DOCUMENTS

CN    103193960 A    7/2013
CN    103214618 A    7/2013

(Continued)

OTHER PUBLICATIONS

Chen, L., et al., "Synthesis and characterization of novel cross-linking poly(butyl acrylate-co-isobornyl methacrylate) colloids prepared via semi-continuous seeded emulsion polymerization," Colloid Journal, vol. 77, Issue 3, pp. 374-381.
Cousinet, S., "Toward replacement of styrene by bio-based methacrylates in unsaturated polyester resins," Euro. Poly. Journal, vol. 67, pp. 539-550.
Datta, S., et al., "Development of solvent-free UV-curable conductive inks for printed flexible microelectronics," Radtech e/5 2006 Tech. Proc.
European Search Report in co-pending Application No. EP 18198819. Date of completion: Mar. 25, 2019. (7 pages).
European Search Report in co-pending Application No. EP 19184657. Date of completion: Oct. 24, 2019. (12 pages).

(Continued)

Primary Examiner — Wenwen Cai
(74) Attorney, Agent, or Firm — Young Basile Hanlon & MacFarlane, P.C.

(57) ABSTRACT

A composition comprising: a) one or more copolymers of i) one or more of one or more vinyl or vinylidene aromatic-monomers and/or (meth)acrylates; with ii) one or more unsaturated compounds containing one or more nucleophilic groups wherein the copolymer contains on average about 0.01 to about 5.0 percent by weight of nucleophilic groups based on the weight of the copolymer; b) one or more thermoplastic elastomer based polymers containing one or more nucleophilic groups; and c) one or more polymers having electrophilic groups; wherein the electrophilic groups have reacted with the nucleophilic groups and at least a portion of the one or more copolymers containing nucleophilic groups are bonded to at least a portion of the one or more thermoplastic elastomers containing one or more nucleophilic groups by at least a portion of the one or more polymers having electrophilic groups.

20 Claims, No Drawings

(56) References Cited

U.S. PATENT DOCUMENTS

| | | | |
|---|---|---|---|
| 2006/0016714 | A1 | 1/2006 | Fregonese et al. |
| 2011/0086973 | A1 | 4/2011 | Kobayashi et al. |
| 2011/0282000 | A1 | 11/2011 | Hayes |
| 2012/0276380 | A1 | 11/2012 | Traser et al. |
| 2013/0163255 | A1 | 6/2013 | Kim |
| 2014/0080967 | A1 | 3/2014 | Hayes |
| 2015/0125500 | A1 | 5/2015 | Watanabe et al. |
| 2015/0368422 | A1 | 12/2015 | Gawryla |
| 2016/0237233 | A1 | 8/2016 | Hood et al. |
| 2019/0038799 | A1 | 2/2019 | Beveridge et al. |

FOREIGN PATENT DOCUMENTS

| | | | |
|---|---|---|---|
| CN | 103225215 | A | 7/2013 |
| CN | 105111359 | A | 12/2015 |
| CN | 105418820 | A | 3/2016 |
| CN | 106800619 | A | 6/2017 |
| CN | 107033272 | A | 8/2017 |
| CN | 107177152 | A | 9/2017 |
| CN | 107573738 | A | 1/2018 |
| CN | 107779138 | A | 3/2018 |
| CN | 107987208 | A | 5/2018 |
| CN | 108219717 | A | 6/2018 |
| DE | 4010511 | A1 | 10/1990 |
| DE | 102009001964 | A1 | 10/2010 |
| EP | 0312001 | A2 | 4/1989 |
| EP | 0412801 | A1 | 2/1991 |
| EP | 0819710 | A2 | 1/1998 |
| EP | 1457518 | A1 | 9/2004 |
| EP | 2924073 | A1 | 9/2015 |
| EP | 3760675 | A1 | 1/2021 |
| FR | 2871470 | A1 | 12/2005 |
| FR | 2943347 | A1 | 9/2010 |
| IN | 190351 | B | 7/2003 |
| JP | S61-152708 | A | 7/1986 |
| JP | S61223708 | A | 10/1986 |
| JP | H08-143607 | A | 6/1996 |
| JP | 2005112889 | A | 4/2005 |
| JP | 2006-22317 | A | 1/2006 |
| WO | 1997/043325 | A1 | 11/1997 |
| WO | 2009/051373 | A2 | 4/2009 |
| WO | 2009/134688 | A2 | 11/2009 |
| WO | 2012/078332 | A1 | 6/2012 |
| WO | 2012/109130 | A1 | 8/2012 |
| WO | 2014/009765 | A1 | 1/2014 |
| WO | 2014/063993 | A1 | 5/2014 |
| WO | 2015/064575 | A1 | 5/2015 |
| WO | 2016188837 | A1 | 12/2016 |
| WO | 2016188839 | A1 | 12/2016 |
| WO | 2017/134189 | A1 | 8/2017 |
| WO | 2018/141489 | A1 | 8/2018 |
| WO | 2020/070284 | A1 | 4/2020 |

OTHER PUBLICATIONS

Extended European Search Report (includes Supplementary European Search Report and European Search Opinion) received for European Patent Applicatioin No. 18108819 dated Mar. 15, 2019, 7 pages.

International Search Report and Written Opinion received for PCT Patent Application No. PCT/EP2019/076904, dated Jan. 7, 2020, 13 pages.

International Search Report and Written Opinion received for PCT Patent Application No. PCT/EP2019/083440, dated Mar. 3, 2020, 14 pages.

International Search Report for PCT/EP2019/076904. Date of completion: Dec. 17, 2019. (3 pages).

Khandelwal, D., "Microstructure determination of isobornyl methacrylate-styrene copolymer by NMR spectroscopy," J. Poly. Research, vol. 21, Issue 4, Article 377.

Montarnal, Damien, et al., "Silica-Like Malleable Materials from Permanent Organic Networks," Science, vol. 334, No. 6058, Nov. 15, 2011, pp. 965-968.

Prandato, E., et al., "Effect of bio-based monomers on the scratch resistance of acrylate photopolymerizable coatings," J. Poly. Sci. B: Poly. Physics, vol. 53, Issue 5, pp. 379-388.

Qu, J., et al., "Synthesis, thermal and optical properties of crosslinked poly(isobornyl methacrylate-co-butyl acrylate) copolymer films," Optical Materials, vol. 36, Issue 4, pp. 804-808.

Zhang et al. "Preparation of Poly(styrene-co-isobornyl methacrylate) Beads Having Controlled Glass Transition Temperature by Suspension Polymerization" Journal Applied Polymer Science 2013, pp. 113-120 DOI: 10.1002/APP.38710, published online on Nov. 3, 2012.

Armstrong, S., "Novel Applications of Co-extruded Multilayer Polymeric Films," Case Western Reserve University Dissertations Publishing, Aug. 2013. (236 pages).

European Search Report and Written Opinion issued for EP 19201905. 0, dated Apr. 3, 2020. (7 pages).

International Preliminary Report on Patentability in co-pending Application No. PCT/EP2020/077937 dated Sep. 24, 2021 (11 pages).

International Search Report and Written Opinion issued for PCT/EP2020/077937, dated Apr. 15, 2021. (9 pages).

Pebax Elastomer Family by Arkema Brochure. (13 pages).

Pebax Elastomers by Arkema Brochure. (11 pages).

Zhang, K. et al., "Supertoughened Renewable PLA Reactive Multiphase Blends System: Phase Morphology and Performance," ACS Appl. Mater. Interfaces, vol. 6, Issue 15, pp. 12436-12448.

Modern Styrenic Polymers, Edited by John Schiers and Duane Priddy, Wiley, ISBN 0 471 49752 5, published in 2003, see pp. 43-72.

* cited by examiner

IMPACT MODIFIED COPOLYMERS OF (METH)ACRYLATE ESTERS AND/OR FREE RADICALLY POLYMERIZABLE MONOMERS CONTAINING NUCLEOPHILIC GROUPS

CROSS-REFERENCE TO RELATED APPLICATIONS

This application is a National Stage 371 entry of PCT/EP2020/077937 filed on Oct. 6, 2020 published as WO 2021069409A1, which claims priority to European Patent Office Application 19201904.0 filed on Oct. 8, 2019, both of which are incorporated herein by reference in its entirety for all purposes.

TECHNICAL FIELD

Disclosed are copolymers containing (meth)acrylates and/or other free radically polymerizable monomers containing nucleophilic groups which are impact modified with thermoplastic elastomer-based polymers containing nucleophilic groups; and polymers having electrophilic groups. Disclosed are the impact modified compositions prepared and the processes for preparing the impact modified compositions. The (meth)acrylates may be cyclic (meth)acrylate esters and/or alkyl (meth)acrylates. Also claimed are articles prepared from such compositions.

BACKGROUND

Polymers exhibiting high glass transition temperatures, opacity or transparency are used in a number of applications of polymeric systems, including packaging (food packaging), medical, electronic, optical, appliance, toys and automotive applications. Polymers containing Bisphenol-A and co-polymers of vinyl or vinylidene substituted aromatic monomers and acrylonitrile were developed to provide polymers with increased glass transition temperatures and use temperatures which can be transparent or opaque. Such polymers may not exhibit great impact properties and modified polymers have been developed to improve the impact resistance. Such modified polymers may contain impact modifiers, such as butadiene-based rubbers, for example copolymers of styrene and acrylonitrile modified with polybutadiene rubber, acrylonitrile-butadiene-styrene (ABS), and high impact polystyrene (HIPS).

There is a desire in the polymer business to increase the content of monomers derived from sustainable raw materials such as recycled and/or biobased raw materials. The concern is that users are not willing to compromise with respect to the properties of the polymers with replacement of traditional monomer systems with sustainable monomers. Examples of attempts to replace traditional monomers in vinyl or vinylidene substituted aromatic monomer containing polymers are disclosed in WO 2016-188839 and WO 2016-188837, and Zhang et al. "Preparation of Poly(styrene-co-isobornyl methacrylate) Beads Having Controlled Glass Transition Temperature by Suspension Polymerization" Journal Applied Polymer Science 2013, pp 113-120 DOI: 10.1002/APP.38710, published online on 3 Nov. 2012. If there are certain unreacted monomers in such copolymers, the unreacted monomers can plasticize the polymers and degrade the properties of the polymers and articles prepared therefrom, for instance the glass transition temperatures, impact properties, and stiffness properties etc. Impact properties of polymer systems containing sustainable monomers may not be as good as provided by a traditional polymer.

There is a demand and need for polymers containing no or a reduced amount of certain monomers, for instance vinyl or vinylidene substituted aromatic monomers, acrylonitrile or Bisphenol A, or which contain increased content of sustainable monomers while maintaining the excellent properties of such polymers, including transparency, high glass transition temperatures, impact properties, stiffness properties and the like. There is a need to provide polymer systems containing sustainable monomers with enhances impact properties.

SUMMARY

Disclosed are polymerizable compositions comprising a) one or more copolymers of i) one or more of one or more vinyl or vinylidene aromatic monomers and/or one or more (meth)acrylates; with ii) one or more unsaturated compounds containing one or more nucleophilic groups wherein the copolymer contains on average about 0.01 to about 5.0 percent by weight of nucleophilic groups based on the weight of the copolymer; b) one or more thermoplastic elastomer based polymers containing one or more nucleophilic groups; and c) one or more polymers having electrophilic groups; wherein the electrophilic groups are reactive with the nucleophilic groups. The one or more (meth)acrylates may be one or more cyclic (meth)acrylates and/or (meth)acrylates. The one or more (meth)acrylates may be one or more cyclic (meth)acrylates and/or alkyl (meth)acrylates.

Disclosed are impact modified polymer systems comprising a) one or more copolymers of i) one or more of one or more vinyl or vinylidene aromatic monomers and/or one or more (meth)acrylates; and ii) one or more unsaturated compounds containing one or more nucleophilic groups wherein the copolymer contains on average about 0.01 to about 5.0 percent by weight of nucleophilic groups based on the weight of the copolymer; b) one or more thermoplastic elastomer based polymers containing one or more nucleophilic groups; and c) one or more polymers having electrophilic groups; wherein the electrophilic groups have reacted with at least a portion of the nucleophilic groups and at least a portion of the one or more copolymers comprising a) one or more copolymers of i) one or more of vinyl or vinylidene aromatic monomers and/or one or more (meth)acrylates; and ii) one or more unsaturated compounds containing one or more nucleophilic groups are bonded to at least a portion of the one or more thermoplastic elastomers containing one or more nucleophilic groups by at least a portion of the one or more polymers having electrophilic groups.

The disclosed compositions may contain the following ingredients or the residue thereof: a) i) one or more copolymers of one or more vinyl or vinylidene aromatic monomers and/or one or more (meth)acrylates; and one or more unsaturated compounds containing nucleophilic groups present in an amount of about 20 to about 99 percent by weight; b) one or more thermoplastic elastomers containing one or more nucleophilic groups present in an amount of about 1 to about 80 percent by weight; and, c) one or more polymers having electrophilic groups present in an amount of about 0.01 to about 25 percent by weight; wherein the percent by weights are based on the total weight of the polymers and copolymers. The one or more thermoplastic elastomer-based polymers containing one or more nucleophilic groups may contain on average about 0.01 to about 5.0 percent by weight of nucleophilic groups. The nucleophilic groups may be pendant from or at the terminal ends, or both pendant from and at the terminal ends of polymer chains of the polymers and copolymers. The nucleophilic groups may be one or more of alkyl carboxylate, carboxylic acid, alcohol, phenol, amine, aniline, imidazole, tetrazole, thiol, boronic acid, glycol, hydrazine and hydroxyl amine groups. The nucleophilic groups may be one or more of alkyl carboxylate, carboxylic acid, amine or hydroxyl groups. The one or more unsaturated compounds containing one or more nucleophilic groups may comprise one or more unsaturated acids, amines, and unsaturated alkyl carboxylates. The one or more unsaturated carboxylic acids comprise acrylic acid, methacrylic acid, 4-vinyl benzoic acid, maleic acid, fumaric acid or mixtures thereof. The unsaturated alkyl carboxylates may comprise one or more alkyl (meth)acrylates.

The copolymers may be one or more copolymers of one or more vinyl or vinylidene aromatic monomers and one or more unsaturated acids. The copolymer of the one or more vinyl or vinylidene aromatic monomers and one or more unsaturated acids may further comprise one or more (meth) acrylates, unsaturated nitriles or conjugated dienes.

The one or more copolymers may be copolymers of one or more vinyl or vinylidene aromatic monomers, one or more cyclic (meth)acrylates and one or more of unsaturated acids and/or unsaturated alkyl carboxylates. The one or more copolymers may be copolymers of one or more cyclic (meth)acrylates, one or more alkyl (meth)acrylates and, optionally, one or more unsaturated acids. The one or more alkyl (meth)acrylates may contain one or more alkyl methacrylates and one or more alkyl acrylates. The one or more alkyl (meth)acrylates may contain methyl methacrylate and butyl acrylate. The copolymers may be copolymers of one or more alkyl acrylates and one or more unsaturated carboxylic acids. The cyclic or polycyclic groups of the cyclic (meth) acrylate esters may be aliphatic. The cyclic or polycyclic groups of the cyclic (meth)acrylate esters may be aliphatic. The cyclic (meth)acrylate esters may comprise one or more of cyclohexyl (meth)acrylate, adamantyl (meth)acrylate, norbornyl (meth)acrylate and isobornyl (meth)acrylate. The cyclic (meth)acrylate esters may comprise isobornyl (meth) acrylate.

The one or more thermoplastic elastomer-based polymers containing one or more nucleophilic groups may comprise one or more thermoplastic copolymers containing one or more nucleophilic groups. The one or more thermoplastic elastomer-based polymers containing one or more nucleophilic groups may comprise one or more of polyetheramides, styrenic block copolymers, acrylic block copolymers, thermoplastic polyurethanes and thermoplastic copolyesters. The one or more thermoplastic elastomer-based polymers containing one or more nucleophilic groups may be one or more of polyetheramides.

The one or more polymers having electrophilic groups may comprise one or more copolymers of one or more vinyl or vinylidene aromatic monomers and/or (meth)acrylate monomers and one or more unsaturated compounds having electrophilic groups. The one or more polymers having electrophilic groups may comprise one or more of (meth) acrylic copolymers and styrene-glycidyl-methacrylate copolymers, olefin-(meth)acrylic ester-glycidyl (meth)acrylate terpolymers, or olefin-glycidyl (meth)acrylate copolymers.

The polymerizable composition may contain one or more catalysts for the reaction of the nucleophilic groups with the electrophilic groups. The one or more catalysts may comprise a salt of a transition metal, an alkali metal, an alkaline earth metal, a post transition metal or a metalloid. The metal may be zinc, zirconium, aluminum, calcium, sodium, copper, magnesium or mixtures thereof. The transition metal, alkali metal, earth alkali metal, post transition metal or metalloid may form a salt with an acetate, carbonate, bicarbonate, methacrylate, fumarate or mixtures thereof. The one or more catalysts may be present in an amount of about 0.0005 to about 5.0 percent by weight based on the amount of polymers and copolymers present. The impact modified polymer systems may contain the residue of the one of more catalysts.

The copolymers may have a weight average molecular weight of about 50,000 g/mole or greater and a glass transition temperature of about 100° C. or greater. The copolymers may have a weight average molecular weight of about 100,000 g/mole or greater or about 120,000 g/mole or greater. The copolymers may contain about 5 percent by weight or greater of sustainable monomer content. The copolymer may exhibit a transparency of about 85 percent or greater. The at least one copolymer may be linear or branched or a combination thereof.

These compositions may contain one or more impact modifier. The compositions disclosed may comprise from about 50 to about 99.5 percent by weight of the monomers recited or the copolymer formed and from about 0.5 to about 50 percent by weight of the impact modifier based on the weight of the composition. The composition may comprise a continuous matrix of the copolymer, and a dispersed phase comprising rubber. The dispersed phase may comprise particles of about 0.05 to about 10.0 microns. The impact modifier may also be grafted to the copolymers described herein. The copolymers may be grafted to the impact modifier. The impact modifier that is grafted to the copolymer or that the copolymer is grafted to may be polybutadiene. The impact modifier may be a polybutadiene rubber or an acrylic based rubber. The impact modifier may have a core shell morphology. The impact modifier may be a core shell rubber comprising a silicone-based core shell rubber, an acrylic based core shell rubber or an ethylene-ethyl acrylate based core shell rubber.

The disclosed copolymers and polymer systems may be blended with another thermoplastic polymer or copolymer. The thermoplastic polymer is one or more of poly(meth) acrylates, polycarbonates, polyesters, polymers containing vinyl or vinylidene substituted aromatic monomers, and the like. The composition may comprise from about 50 to about 99.5 percent by weight of one or more of the impact modified system and from about 0.5 to about 50 percent by weight of one or more other thermoplastic polymers.

Disclosed is method of preparing an impact modified polymer system as disclosed comprising: contacting a) one or more copolymers of i) one or more of vinyl or vinylidene aromatic monomers and/or one or more (meth)acrylates; with ii) one or more unsaturated compounds containing one or more nucleophilic groups wherein the copolymer contains on average about 0.01 to about 5.0 percent by weight of nucleophilic groups based on the weight of the copolymer, present in an amount of about 20 to about 99 percent by weight; b) one or more thermoplastic elastomers containing one or more nucleophilic groups present in an amount of about 1 to about 80 percent by weight; and, c) one or more polymers having electrophilic groups present in an amount of about 0.01 to about 25 percent by weight; at a temperature of about 200° C. to about 300° C. for a time period of about 0.5 to about 5 minutes; such that the electrophilic groups react with the nucleophilic groups and at least a portion of the one or more copolymers are bonded to at least a portion of the one or more thermoplastic elastomers containing one or more nucleophilic groups by at least a portion of the one or more polymers having electrophilic groups. The copolymers and the polymers may be contacted in the presence of catalyst for the reaction of electrophilic groups with nucleophilic groups as disclosed herein.

Disclosed are articles prepared from the compositions disclosed herein. Such articles may be fabricated in any known manner commonly used with polymers containing one or more vinyl or vinylidene substituted aromatic compounds. The articles may be fabricated by molding, extrusion, thermoforming, foaming, blow molding, injection molding, extrusion blow molding and combinations thereof. The articles may be molded, extruded, and the like. The articles disclosed may exhibit glass transition temperatures of about 100° C. or greater. The copolymers, compositions and articles disclosed may be transparent or opaque. The copolymers, compositions and articles disclosed may exhibit a transparency of 85 percent or greater. The copolymers disclosed exhibit glass transition temperatures of about 100° C. or greater, 110° C. or greater, 120° C. or greater or 140° C. or greater. The copolymers may exhibit a polydispersity of 3 or less. The copolymers may exhibit a polydispersity of 2 or greater. The sustainable monomer content of the copolymers or compositions may be 10 percent by weight or greater, 15 percent by weight or greater or 20 percent by weight or greater. The copolymers may contain modern carbon or $^{14}C$. The impact modified polymer systems exhibit a Charpy or Izod impact strength of 5 kJ/m$^2$ or higher when measured at 23° C. on a notched specimen.

DETAILED DESCRIPTION

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The following procedures are used to determine the properties of polymer systems or articles made therefrom.

Gel permeation chromatography (GPC)—0.25 wt % polymer samples in THF (HPLC grade, uninhibited) are prepared at room temperature. 500 ppm 1,4-Di-t-butylbenzene are added as flow marker. Molecular weight distribution of copolymers are determined relative to polystyrene standards on a high performance liquid chromatograph fitted by 2 columns in series (PLgel 5-micron Mixed-C, 30-cm×7.5-mm) at 40° C. 50 μL is injected, polymers are eluted at 1.0 ml/min flow rate and molecular weight distributions are determined by diode array detector at 254 nm or by refractive index detector.

Differential scanning calorimetry (DSC) (ASTM D3418-15). 5-10 mg polymer sample is subjected to heating (20° C./min) up to 250° C. under nitrogen, cooled down (20° C./min) to room temperature and heated up (20° C./min) again. Glass transition temperatures (Tg) of copolymers are determined from the second heating curves.

Gas chromatography (GC). 750 mg of polymer is dissolved by shaking in 5 ml DCM which contains 0.5 mg n-butyl benzene as internal standard. When sample is dissolved (after 1 h), 15 ml MeOH is added to precipitate the polymer. 2 ml of supernatant is filtered (0.45 μm) and 2 μL is injected into GC column. Injector temperature is 250° C. and flame ionization detector temperature is 300° C. Oven temperature is 65° C. for the first 4 mins and then it heats up to 300° C. (15° C./min) and stays constant for 16 min. Helium is used as the carrier gas.

Transparency (ASTM D1003). Transparency of polymers are tested on plaques (50 mm×75 mm×3 mm) which were injection molded using a mirror plate mold. Transmission is recorded at 23° C. between 400 nm and 700 nm using Datacolor 850 with following settings: Specular included, Aperture medium and UV filter 0% UV (Filter FL40).

Sustainable monomer refers to monomers that are recycled from post-consumer waste streams or are biobased monomers. The monomers used as disclosed hereinafter may be virgin monomers, derived directly from one or more of a traditional synthesis process using hydrocarbons as the feed, recycled monomers, derived from post-consumer waste streams, or biobased monomers, derived from plant-based sources. The monomers may be based on a combination of virgin polymers and recycled monomer and/or biobased monomers. Biobased monomer content means the percentage by weight of monomers in the copolymers derived from biologically based raw materials and not from petroleum-based sources. Biobased monomers useful with the compositions described herein include monomers containing biobased carbon. The term biobased carbon means carbon obtained from a biological source rather than a fossil oil-based source. The biobased content of a monomer, a copolymer, or a copolymer composition can be determined using a method such as ASTM D6866-08. ASTM D6866-08 provides three different methods for determining the biobased content of a solid, liquid, or gaseous composition. For example, the compositions described herein can be dried as a film and tested as a solid. As defined by ASTM D6866-08, biobased content is the amount of biobased carbon in the material or product as a percent of the weight (mass) of the total organic carbon in the product. In particular, ASTM D6866-08 Method B measures the ratios of $^{14}C/^{12}C$ and $^{13}C/^{12}C$ in the composition using Accelerator Mass Spectrometry (AMS) and Isotope Ratio Mass Spectrometry (IRMS). Fossil based carbon contains essentially no $^{14}C$ because its age is much greater than the 5,730 year half-life of $^{14}C$. Thus, the presence and level of $^{14}C$ in a composition provides a direct measure of the amount of carbon that originated from a source other than a fossil fuel, i.e., the level of biobased carbon in the composition. Copolymer as used herein refers to polymers containing the residue of two or more monomers. Carbon based on biological sources is referred to as modern carbon.

One or more as used herein means that at least one or more than one, of the recited components may be used as disclosed. Residual content, or residue, of a component is the amount of the component present in free form or reacted with another material, such as a polymer. The residual content of a component is calculated from the ingredients utilized to prepare the component or composition. Alternatively, it can be determined utilizing known analytical techniques. Heteroatom as used herein means nitrogen, oxygen, silicon, and sulfur; heteroatoms include nitrogen and oxygen, or oxygen. Hydrocarbyl refers to a group containing one or more carbon atom backbones and hydrogen atoms, which may optionally contain one or more heteroatoms. Where the hydrocarbyl group contains heteroatoms, the heteroatoms may form one or more functional groups well known in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. Valence as used herein means a covalent bond between a hydrocarbyl or hydrocarbylene group and another group such as a carbonyl, oxygen, nitrogen or sulfur containing group or atom, or the referenced base compound. As used herein percent by weight or parts by weight refer to, or are based on, the weight of the compositions unless otherwise specified.

The copolymers may contain one or more (meth)acrylates. The (meth)acrylates may comprise one or more of cyclic (meth)acrylates and/or non-cyclic (meth)acrylates. Non-cyclic (meth)acrylates are (meth)acrylates are acrylates not containing a cyclic hydrocarbyl group, it may be aliphatic.

The copolymers disclosed herein may contain one or more cyclic (meth)acrylate esters. The cyclic (meth)acrylate esters contain a (meth)acryloyl radical bonded to a six-membered carbon ring, optionally containing a bridged ring and said group of monomers may include decahydronaphtyl (meth)acrylates, isobornyl (meth)acrylate, 2-norbornyl (meth)acrylate, cyclohexyl (meth)acrylate and adamantyl (meth)acrylates, and included are products according to the formula:

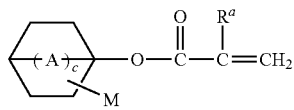

wherein $R^a$ is separately in each occurrence H or —CH$_3$;

A is separately in each occurrence —CH$_2$—, —CH(CH$_3$)— or —C(CH$_3$)$_2$—;

one or more M may be covalently bonded to any carbon of the cyclic rings and may be separately hydrogen, halogen, alkyl or alkylamino group, alkoxy group or a plurality thereof. Each M may be bonded to a carbon atom of the six-membered ring. There may be 0 to 4, 0 to 2, 0 to 1, or 0 of M present on the cyclic ring. c may be 0 or 1.

Non-limiting examples of the cyclic (meth)acrylate esters include isobornyl (meth)acrylate, bornyl (meth)acrylate, fenchyl (meth)acrylate, isofenchyl (meth)acrylate, norbornyl (meth)acrylate, cis, (endo) 3-methylamino-2-bornyl (meth)acrylate, 1,4,5,6,7,7-hexachlorobicyclo[2.2.1]-hept-5-ene-2-ol (meth)acrylate (HCBOMA) and 1,4,5,6,7,7-hexachlorobicyclo[2.2.1]-hept-5-ene-2 methanol (meth)acrylate (HCBMA), cyclohexyl (meth)acrylate, adamantyl (meth)acrylate, and mixtures of such bicyclic (meth)acrylates. The cyclic (meth)acrylate ester may be cyclohexyl (meth)acrylate, adamantyl (meth)acrylate, norbornyl (meth)acrylate, isobornyl (meth)acrylate or mixtures thereof. The cyclic (meth)acrylate ester may be isobornyl methacrylate. The cyclic (meth)acrylate esters are known per se and may be prepared in known fashion or may be obtained from commercial sources. The cyclic (meth)acrylates may be biobased compounds. Examples, of biobased monomers include, but are not limited to, isobornyl acrylate, isobornyl methacrylate, tetrahydrofurfuryl acrylate, tetrahydrofurfuryl methacrylate, and mixtures thereof. An example of an isobornyl acrylate includes SR506D (isobornyl acrylate) and an example of isobornyl (meth)acrylate includes SR423D (isobornyl methacrylate) (Sartomer Company; Exton, Pa.).

An example of a tetrahydrofurfuryl acrylate includes SR285 (tetrahydrofurfuryl acrylate) and an example of a tetrahydrofurfuryl (meth)acrylate includes SR203 (tetrahydrofurfuryl methacrylate) (Sartomer Company). The Sartomer isobornyl acrylate SR506D contains 76.9% biobased carbon and the Sartomer tetrahydrofurfuryl acrylate SR285 contains 62.5% biobased carbon.

The copolymers or polymerizable composition can have a sustainable monomer content, biobased and or recycled monomer content of 10 or greater weight percent based on the weight of the copolymer; of 12 or greater weight percent, 14 or greater weight percent, 16 or greater weight percent, 18 or greater weight percent, 20 or greater weight percent, 25 or greater weight percent, 30 or greater weight percent, 35 or greater weight percent, 40 or greater weight percent, 45 or greater weight percent, 50 or greater weight percent, 55 or greater weight percent, 60 or greater weight percent, 65 or greater weight percent, 70 or greater weight percent, 75 or greater weight percent, and up to 80 weight percent. The polymerizable composition or copolymer may contain a sufficient amount of sustainable (meth)acrylates to provide the desired sustainable monomer content, glass transition temperature as described herein.

The copolymers disclosed herein contain cyclic (meth)acrylates in sufficient amount to provide the properties disclosed herein. The copolymers disclosed herein contain cyclic (meth)acrylates in an amount of about 20 percent by weight of the polymerizable compositions or copolymers or greater, about 35 percent by weight or greater about 40 percent by weight or greater, about 40 percent by weight or greater, or about 55 percent by weight or greater. The polymerizable compositions and copolymers disclosed herein may contain cyclic (meth)acrylates in an amount of about 99 percent by weight of the polymerizable compositions or copolymers or less, about 95 percent by weight or less, about 90 percent by weight or less, about 80 percent by weight or less, about 70 percent by weight or less, or about 65 percent by weight or less.

The copolymers disclosed herein may contain vinyl or vinylidene substituted aromatic monomers. Vinyl or vinylidene substituted aromatic monomers comprise vinylidene or alkenyl groups, bonded directly to aromatic structures. The vinyl or vinylidene substituted aromatic monomers may contain one or more aromatic rings, may contain one or two aromatic rings, or may contain one aromatic ring. The aromatic rings can be unsubstituted or substituted with a substituent that does not interfere with polymerization of the vinyl or vinylidene substituted aromatic monomers, or the fabrication of the polymers formed into desired structures. The substituents may be halogens or alkyl groups, such as bromine, chlorine or $C_{1-4}$ alkyl groups; or a methyl group. Alkenyl groups comprise straight or branched carbon chains having one or more double bonds, or one double bond. The alkenyl groups useful for the vinyl or vinylidene substituted aromatic monomers may include those that when bonded to an aromatic ring are capable of polymerization to form copolymers. The alkenyl groups may have 2 to 10 carbon atoms, 2 to 4 carbon atoms or 2 carbon atoms. Exemplary vinyl or vinylidene substituted aromatic monomers include styrene, alpha methyl styrene, N-phenyl-maleimide and chlorinated styrenes; or alpha-methyl styrene and styrene. The vinyl or vinylidene substituted aromatic monomers may be mono-vinyl or vinylidene aromatic monomers, which contain one unsaturated group. Vinyl or vinylidene aromatic monomers include but are not limited to those described in U.S. Pat. Nos. 4,666,987; 4,572,819 and 4,585,825, which are herein incorporated by reference.

Vinyl or vinylidene substituted aromatic monomers comprise vinylidene or alkenyl groups bonded directly to aromatic structures. The vinyl or vinylidene substituted aromatic monomers may contain one or more aromatic rings, may contain one or two aromatic rings, or may contain one aromatic ring. The aromatic rings can be unsubstituted or substituted with a substituent that does not interfere with polymerization of the vinyl or vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. Alkenyl groups comprise straight or branched carbon chains having one or more double bonds, or one double bond. The alkenyl groups useful for the vinyl or vinylidene substituted aromatic monomers may include those that when bonded to an aromatic ring are capable of polymerization to form copolymers. The alkenyl groups may have 2 to 10 carbon atoms, 2 to 4 carbon atoms or 2 carbon atoms. Exemplary vinyl or vinylidene substituted aromatic monomers include styrene, alpha methyl styrene, N-phenyl-maleimide and chlorinated styrenes; or alpha-methyl styrene and styrene. The vinyl or vinylidene substituted aromatic monomers may be mono-vinyl or -vinylidene aromatic monomers, which contain one unsaturated group. Vinyl or vinylidene aromatic monomers include but are not limited to those described in U.S. Pat. Nos. 4,666,987; 4,572,819 and 4,585,825, which are incorporated by reference. The monomer may correspond to the formula:

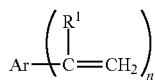

Wherein $R^1$ is separately in each occurrence hydrogen or methyl; and

Ar is separately in each occurrence an aromatic group. Ar may contain one or more aromatic rings, may contain one or two aromatic rings, or may contain one aromatic ring. n is separately in each occurrence 1 to 3, 1 to 2 or 1. The aromatic rings can be unsubstituted or substituted with a substituent that does not interfere with polymerization of the vinyl or vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. The vinyl or vinylidene substituted aromatic monomers may be present in the polymerizable composition or copolymers in a sufficient amount such that the polymer exhibits the advantageous properties associated with polymers of vinyl or vinylidene substituted aromatic monomers, for instance polystyrene. The advantageous properties of polymers of vinylidene substituted monomers include glass transition temperatures of about 100° C. or greater, transparency where desired for the use, high heat deflection temperatures, and the like. The copolymers disclosed herein may contain vinyl or vinylidene substituted aromatic monomers in an amount of about 0 percent by weight of the polymerizable compositions or copolymers or greater, about 1 percent by weight or greater or about 20 percent by weight or greater. The copolymers disclosed may contain vinyl or vinylidene substituted aromatic monomers in an amount of about 80 percent by weight of the polymerizable compositions or copolymers or less, 65 percent by weight or less, about 35 percent by weight or less, about 30 percent by weight or less or about 10 percent by weight or less or about 1 percent. The recited amounts may relate to the amounts of vinyl or vinylidene substituted aromatic monomers.

The copolymers may contain branching agents commonly used in vinyl or vinylidene aromatic based polymers. The branching agents may be vinyl or vinylidene substituted aromatic monomers having 2 or more vinylidene groups. Other branching agents may include other difunctional and in general multifunctional (functionality>2) monomers, multifunctional initiators and multifunctional chain transfer agents and the like. The branching agents may be present in the polymerizable compositions in an amount of about 0.001 percent by weight of the composition or greater, about 0.002 percent by weight or greater or about 0.003 percent by weight or greater. The branching agents may be present in the polymerizable compositions in an amount of about 0.5 percent by weight of the composition or less, about 0.2 percent by weight or less or about 0.1 percent by weight or less.

The amount of vinyl or vinylidene substituted aromatic compounds and/or (meth)acrylates (cyclic or polycyclic (meth)acrylate esters) in the copolymers is sufficient to provide the desired glass transition temperatures and optionally the desired transparencies. The amount of vinyl or vinylidene substituted aromatic compounds and/or cyclic or polycyclic (meth)acrylate esters in the copolymers may be about 50 percent by weight or greater, about 70 percent by weight or about 80 percent by weight or greater based on the weight of the copolymer. The amount of vinyl or vinylidene substituted aromatic compounds and/or cyclic or polycyclic (meth)acrylate esters in the copolymers may be about 100 percent by weight or less, or about 90 percent by weight or less based on the weight of the copolymer.

The one or more unsaturated compounds containing one or more nucleophilic groups may contain one type of nucleophilic groups. The copolymers may contain more than one type of nucleophilic groups or may contain only one type of nucleophilic group. The copolymers may be prepared from more than one unsaturated compound each containing a different type of nucleophilic group. The copolymers may be prepared from one species of unsaturated compounds each containing the same nucleophilic group. The one or more copolymers containing one or more nucleophilic groups may contain a mixture of copolymers which contain polymer chains having differing amounts of nucleophilic groups. The nucleophilic groups may be pendant from the chain of the copolymer, at the terminal end of the co-polymer chains or both. The nucleophilic groups may be pendant from the chain of the copolymer The one or more unsaturated compounds containing nucleophilic groups may contain any nucleophilic group that reacts with an electrophilic group under the conditions described herein. Nucleophilic group as used herein is a group which donates an electron pair to make a covalent bond. The nucleophilic group also refers to groups which form nucleophilic groups under the reaction conditions for forming the impact modified compositions, for example carboxylate groups that form carboxylic acids under the reaction conditions, groups that form secondary or primary amines or hydroxyl groups under such reaction conditions. Exemplary nucleophilic groups include carboxylate, carboxylic acid, alcohol, phenol, amine, aniline, imidazole, tetrazole, thiol, boronic acid, glycol, hydrazine and hydroxyl amine groups. Nucleophilic groups may be carboxylic acid groups. The one or more unsaturated compounds containing nucleophilic groups may be (meth) acrylic acids, (meth) acrylates, hydroxyalkyl (meth)acrylates, and the like. The one or more unsaturated compounds containing nucleophilic groups may be methacrylic acid or acrylic acid. The unsaturated groups containing carboxylate groups under the reaction conditions disclosed for preparing the impact modified compositions may have the alkyl groups on the carboxylate group disassociate to form nucleophilic groups reactive with electrophilic groups.

The copolymers disclosed herein may comprise one or more (meth)acrylates or one or more alkyl (meth)acrylates. (Meth)acrylate as used herein refers to compounds having a vinyl group bonded to the carbonyl moiety of an ester or alkyl ester wherein the carbon of the vinyl group bonded to the carbonyl group further has a hydrogen or a methyl group bonded thereto. The term (meth) as used in this context refers to compounds having either of a hydrogen or methyl group on the carbon of the vinyl group bonded to the carbonyl group. Methacrylate as used herein refers to compounds having a vinyl group bonded to the carbonyl moiety of an alkyl ester wherein the carbon of the vinyl group bonded to the carbonyl group further has a methyl group bonded thereto. Acrylate as used herein refers to compounds having a vinyl group bonded to the carbonyl moiety of an alkyl ester wherein the carbon of the vinyl group bonded to the carbonyl group further has a hydrogen. The use of alkyl methacrylate without the parenthesis means the compound referred to has a methyl group on the carbon adjacent to the carbonyl group, that is $R^a$ is methyl. The use of alkyl acrylate means the compound referred to does not have a methyl group on the carbon adjacent to the carbonyl group, that is $R^a$ is hydrogen. The alkyl groups of the (meth) acrylates may have one or greater, two or greater, three or greater or four carbons in the alkyl group. The alkyl groups of the (meth)acrylates may have 30 or less, 10 or less, 6 or less or 4 or less carbons in the alkyl group. (Meth)acrylates useful include those that correspond to the formula:

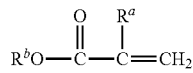

wherein $R^a$ is separately in each occurrence H or —$CH_3$; and $R^b$ may be separately in each occurrence an alkyl group that allows the (meth)acrylate form a homopolymer having a glass transition temperature of about 100° C. or greater. $R^b$ may be a $C_1$ to $C_{-30}$ alkyl group, $C_{1-10}$ alkyl group, $C_{1-6}$ alkyl group, $C_{1-4}$ alkyl group or $C_1$ alkyl. $R^b$ may be a $C_2$ to $C_{-30}$ alkyl group, $C_{2-10}$ alkyl group, $C_{2-6}$ alkyl group or $C_{3-4}$ alkyl group. The (meth)acrylates may contain a mixture of (meth) acrylates such that for one (meth)acrylate $R^b$ is $C_1$ and for one or more other the other $R^b$ may be a $C_{2-30}$ alkyl group, $C_{2-10}$ alkyl group, $C_{2-6}$ alkyl group or $C_{3-4}$ alkyl group The one or more (meth)acrylates may include methyl (meth) acrylate and one or more of ethyl (meth)acrylate, propyl (meth)acrylate, butyl (meth)acrylate, pentyl (meth)(acrylate) and hexyl (meth) acrylate. Examples of the one or more (meth)acrylates include lower alkyl (meth)acrylates, such as methyl (meth)acrylate, ethyl (meth)acrylate, propyl (meth) acrylate, butyl (meth)acrylate, pentyl (meth)acrylate and hexyl (meth)acrylate. The one or more (meth)acrylates may include methyl (meth)acrylate and one or more of ethyl (meth)acrylate, propyl (meth)acrylate, butyl (meth)acrylate, pentyl (meth)(acrylate) and hexyl (meth)acrylate. The one or more (meth)acrylates may include methyl (meth)acrylate and butyl (meth)acrylate. The one or more (meth)acrylates in the polymerizable composition may be present in sufficient amount to provide the desired properties of the copolymer such as processability, practical toughness, refractive index, sustainable monomer content, scratch resistance, environmental stress crack resistance, hydrolytic stability, thermal stability, UV stability, impact resistance, weatherability, and the like. The alkyl (meth)acrylates may be a mixture of one or more of virgin and/or sustainable monomers. The alkyl (meth)acrylates may be entirely recycled, biobased or virgin. The polymerizable compositions and copolymers disclosed herein contain (meth)acrylates such as alkyl (meth)acrylates in an amount of about 0 percent by weight of the polymerizable composition or copolymers or greater, about 1 percent by weight or greater or about 2 percent by weight or greater, 5 percent by weight or greater, 10 percent by weight or greater, 20 percent by weight or greater or 30 percent by weight or greater. The polymerizable composition and copolymers disclosed herein contain (meth)acrylates such as alkyl(meth)acrylates in an amount of about 80 percent by weight of the polymerizable composition or copolymers or less, about 65 percent by weight or less about 35 percent by weight or less, about 30 percent by weight or less, about 20 percent by weight or less, about 15 percent by weight or less, or about 10 percent by weight or less or 1 percent by weight or less.

The copolymers may comprise one or more cyclic (meth) acrylate esters, one or more alkyl methacrylates, such as methyl methacrylate, and one or more $C_{2-8}$ alkyl acrylates. The amounts of the one or more cyclic (meth)acrylate esters and one or more alkyl methacrylates are as disclosed herein. The one or more $C_{2-8}$ alkyl acrylates are present to improve the processability of the copolymers prepared. The one or more alkyl acrylates may be a $C_{2-4}$ acrylate or butyl acrylate. The one or more $C_{2-8}$ alkyl acrylates are present in a sufficient amount to improve the processability of the copolymers prepared. The one or more $C_{2-8}$ alkyl acrylates may be present in an amount of about 1.0 percent by weight of the polymerization composition or copolymers or greater, about 5 percent or greater or about 10 percent by weight or greater. The one or more $C_{2-8}$ alkyl acrylates may be present in an amount of about 30 percent by weight of the polymerization composition or copolymers or less, about 25 percent or less or about 20 percent by weight or less. The monomers may be any combination of virgin, recycled or biobased.

The copolymers disclosed herein may comprise one or more monomers polymerizable by free radical polymerization. The one or more monomers polymerizable by free radical polymerization may copolymerize with the other monomers disclosed herein. The one or more monomers polymerizable by free radical polymerization may contain unsaturated groups. In this context the monomers polymerizable by free radical polymerization do not include or are not alkyl or cyclic (meth)acrylates. The monomers polymerizable by free radical polymerization may comprise one or more of acrylamides, methacrylamides, unsaturated nitriles, vinyl esters, vinyl or vinylidene substituted aromatic compounds, olefins, isocyanates, conjugated dienes, vinyl monomers, N-vinyl pyrollidone; allyl methacrylate, vinyl toluene, vinyl benzophenone, diallyl phthalate, dialkyl maleates or fumarates, such as dimethyl maleate, diethyl maleate, dibutyl maleate, the corresponding fumarates, N-phenyl maleimide (N-PMI), maleic anhydride and divinyl benzene. Exemplary vinyl esters include vinyl acetate and vinyl propionate. Exemplary vinyl monomers include vinyl chloride, vinylidene chloride and N-vinyl pyrollidone. Exemplary conjugated dienes include butadiene and isoprene. Unsaturated nitriles include, but are not limited to acrylonitrile, methacrylonitrile, ethacrylonitrile, fumaronitrile and mixtures thereof. The unsaturated nitrile may be acrylonitrile. The use of the term "(meth)" followed by another term such as acrylate, acrylonitrile, or acrylamide, as used throughout the disclosure, refers to both acrylate, acrylonitrile, or acrylamide and methacrylate, methacrylonitrile, or methacrylamide.

The polymerizable compositions or copolymers disclosed may contain one or more compounds polymerizable by free radical polymerization; in an amount of about 0 percent by weight of the copolymers or greater, about 1 percent by weight or greater or about 2 percent by weight or greater, 5 percent by weight or greater, 10 percent by weight or greater, 20 percent by weight or greater or 30 percent by weight or greater. The polymerizable compositions or copolymers disclosed herein may contain one or more compounds polymerizable by free radical polymerization; in an amount of about 80 percent by weight of the or copolymers or less, 65 percent by weight or less, about 35 percent by weight or less, about 30 percent by weight or less, about 20 percent by weight or less, about 15 percent by weight or less, about 15 percent by weight or less or about 10 percent by weight or less or 1 percent by weight or less.

The polymerizable compositions and copolymers disclosed herein may contain one or more unsaturated nitriles. Unsaturated nitriles include, but are not limited to, acrylonitrile, methacrylonitrile, ethacrylonitrile, fumaronitrile and mixtures thereof. The unsaturated nitrile may be acrylonitrile. The unsaturated nitriles are used in the polymerizable compositions and copolymers to enhance the glass transition temperature, transparency, chemical resistance and the like. The polymerizable compositions and copolymers disclosed herein may contain one or more unsaturated nitriles in an amount of about 0 percent by weight of the polymerizable compositions or copolymers or greater, about 1 percent by weight or greater or about 2 percent by weight or greater. The polymerizable compositions and copolymers disclosed herein may contain one or more unsaturated nitriles in an amount of about 35 percent by weight of the polymerizable compositions or copolymers or less, about 20 percent by weight or less, about 10 percent by weight or less or about 1 percent by weight or less.

The copolymers disclosed herein may comprise one or more cyclic (meth)acrylate esters; one or more alkyl (meth)acrylates; and one or more unsaturated compounds containing nucleophilic groups or electrophilic groups; and optionally any other of the other polymerizable compounds disclosed herein.

The one or more unsaturated compounds containing electrophilic groups may contain any electrophilic group that reacts with a nucleophilic group under the conditions described herein. Electrophilic group as used herein is a group which receives an electron pair to form a covalent bond. Exemplary electrophilic groups include epoxide, anhydride, imide, ester, acyl halide, acyl nitrile, aldehyde, ketone, isocyanate and isothiocyanate groups. Electrophilic groups may be epoxide groups. The one or more unsaturated compounds containing electrophilic groups may be glycidyl (meth)acrylates, and the like. The polymerizable compositions and copolymers disclosed may contain one or more unsaturated compounds containing nucleophilic groups in an amount of about 0 percent by weight of the polymerizable composition or copolymers or greater, about 0.1 percent by weight or greater about 1.0 percent by weight or greater or about 2.0 percent by weight or greater. The polymerizable composition and copolymers disclosed herein contain one or more unsaturated compounds containing nucleophilic groups in an amount of about 10 percent by weight of the polymerizable composition or copolymers or less, about 5.0 percent by weight or less, or about 2.0 percent by weight or less.

The polymer systems disclosed herein contain one or more thermoplastic elastomer-based polymers containing one or more nucleophilic groups. The one or more thermoplastic elastomer-based polymers containing one or more nucleophilic groups can be any thermoplastic elastomer-based polymers which will react with electrophilic groups and improve the impact properties of the polymer systems. The one or more thermoplastic elastomer-based polymers containing one or more nucleophilic groups may be one or more thermoplastic copolymers containing one or more nucleophilic groups. The one or more thermoplastic elastomer-based polymers containing one or more nucleophilic groups comprise one or more of polyetheramides, styrenic block copolymers, acrylic block copolymers, thermoplastic polyurethanes and thermoplastic copolyesters. The one or more thermoplastic elastomer-based polymers containing one or more nucleophilic groups may contain a sufficient amount of nucleophilic groups to react with the one or more polymers having electrophilic groups. The amount of nucleophilic groups on the one or more thermoplastic elastomer based polymers containing one or more nucleophilic groups may be about 0.01 percent by weight or greater based on the weight of the polymer, about 0.05 percent by weight or greater or about 0.2 percent by weight or greater. The amount of nucleophilic groups on the one or more thermoplastic elastomer based polymers containing one or more nucleophilic groups may be about 20 percent by weight or less based on the weight of the polymer, about 15 percent by weight or less or about 10 percent by weight or less. The amount of thermoplastic elastomer-based polymers containing one or more nucleophilic groups present in the polymerizable compositions and the polymer systems is that amount which improves the impact properties of the polymer systems. The amount of thermoplastic elastomer based polymers containing one or more nucleophilic groups in the polymerizable compositions and the polymer systems may be about 5 percent by weight or greater based on the weight of the copolymers and polymers in the polymerizable composition or polymer system, about 7 percent by weight or greater or about 10 percent by weight or greater. The amount of the one or more thermoplastic elastomer based polymers containing one or more nucleophilic groups in the polymerizable compositions and the polymer systems may be about 50 percent by weight or less based on the weight of the based on the weight of the copolymers and polymers in the polymerizable composition or polymer system, about 45 percent by weight or less or about 40 percent by weight or less.

The compositions and polymer systems disclosed herein contain one or more polymers having electrophilic groups. The one or more polymers having electrophilic groups can be any polymers wherein the electrophilic groups can react with nucleophilic groups. The one or more polymers having electrophilic groups may comprise one or more copolymers of one or more vinyl or vinylidene aromatic monomers and/or (meth)acrylate monomers and one or more unsaturated compounds having electrophilic groups. The one or more polymers having electrophilic groups may comprise one or more of (meth)acrylic copolymers and styreneglycidyl-methacrylate copolymers, olefin-(meth)acrylic ester-glycidyl (meth)acrylate terpolymers, or olefin-glycidyl (meth)acrylate copolymers.

The concentration of the electrophilic groups on the one or more polymers containing electrophilic groups are chosen based on the concentration of nucleophilic groups on the one or more copolymers and the thermoplastic elastomers having nucleophilic groups to form the cured desired compositions (e.g., cross-linked). The concentration of the electrophilic groups on the one or more polymers containing electrophilic groups may be about 5 percent by weight of the polymer, or greater, about 10 percent by weight or greater, about 15 percent by weight or greater or about 20 percent by weight or greater. The concentration of the electrophilic groups on the one or more polymers containing an electrophilic group may be about 60 percent by weight of the polymer or less, about 50 percent by weight or less or about 40 percent by weight or less.

The equivalents ratio of electrophilic groups on the one or more polymers containing electrophilic groups to the nucleophilic groups on the copolymers and polymers containing nucleophilic groups is chosen such that when the polymers and copolymers are reacted, desired polymers are formed (e.g., crosslinked or grafted polymers are prepared). Equivalents as used in this context means the number of electrophilic groups or nucleophilic groups available to react with the other. The equivalents ratio of electrophilic groups to nucleophilic groups may be about 0.1:1.0 or greater, about 0.3:1.0 or greater or 0.5:1.0 or greater. The equivalents ratio of electrophilic groups to nucleophilic groups may be about 10:1 or less, about 4:1 or less or 2:1 or less. The amount of polymers having electrophilic groups present in the polymerizable compositions and the polymer systems is that amount which improves the impact properties of the polymer systems. The amount of polymers having electrophilic groups in the polymerizable compositions and the polymer systems may be about 2 percent by weight or greater based on the weight of the copolymers and polymers in the polymerizable composition or polymer system, about 3 percent by weight or greater or about 5 percent by weight or greater. The amount of polymers having electrophilic groups present in the polymerizable compositions and the polymer systems may be about 25 percent by weight or less based on the weight of the based on the weight of the copolymers and polymers in the polymerizable composition or polymer system, about 20 percent by weight or less or about 15 percent by weight or less.

The compositions disclosed may contain impact modifiers. The terms impact modifiers and rubbers are used interchangeably. Various impact modifiers may be used in the compositions disclosed; such as diene rubbers, ethylene propylene rubbers, ethylene propylene diene (EPDM) rubbers, ethylene copolymer rubbers, acrylate rubbers, polyisoprene rubbers, silicon rubbers, silicon-acrylate rubbers, polyurethanes, thermoplastic elastomers, halogen containing rubbers, interpolymers of rubber-forming monomers with other copolymerizable monomers and mixtures thereof. The rubbers may be present in the formulated composition in sufficient amount to provide the desired impact properties to the composition. Desired impact properties include increased izod, charpy, gardner, tensile, falling dart, and the like. The compositions disclosed may contain impact modifiers (rubbers) in an amount of about 0.5 percent by weight of the compositions or greater, about 1 percent by weight or greater or about 2 percent by weight or greater. The compositions disclosed herein contain impact modifiers (rubbers) in an amount of about 50 percent by weight of the compositions or less, about 45 percent by weight or less, about 40 percent by weight or less, about 30 percent by weight or less, about 20 percent by weight or less or about 10 percent by weight or less. The compositions containing such impact modifiers may contain the polymerized compositions disclosed in an amount of about 50 percent by weight of the compositions or greater. The compositions containing such impact modifiers may contain polymerized compositions disclosed in an amount of about 99.5 percent by weight of the compositions or less, 90 percent by weight of the compositions or less, 80 percent by weight of the compositions or less or 60 percent by weight of the compositions or less. Compositions, formulated compositions, as used in this context are the formulated compositions containing all of the ingredients for the intended use.

The rubbers may be diene rubbers such as polybutadiene, polyisoprene, polypiperylene, polychloroprene, and the like or mixtures of diene rubbers, that is, any rubbery polymers of one or more conjugated 1,3-dienes, such as 1,3-butadiene. Such rubbers include homopolymers of 1,3-butadiene and copolymers of 1,3-butadiene with one or more copolymerizable monomers, such as vinyl or vinylidene substituted aromatic (styrene). The diene rubber may be the homopolymer of 1,3-butadiene. Exemplary copolymers of 1,3-butadiene are block or tapered block rubbers of at least about 30 weight percent 1,3-butadiene, from about 50 weight percent, from about 70 weight percent, or from about 90 weight percent 1,3-butadiene and up to about 70 weight percent vinyl or vinylidene substituted aromatic monomer, up to about 50 weight percent, up to about 30 weight percent, or up to about 10 weight percent vinyl or vinylidene substituted aromatic monomer, weights based on the weight of the 1,3-butadiene copolymer.

The impact modifiers employed may be those polymers and copolymers which exhibit a second order transition temperature, sometimes referred to as the glass transition temperature (Tg), for the diene fragment which is 0° C. or less or −20° C. or less as determined using conventional techniques, for example ASTM Test Method D 746-52 T. Tg is the temperature or temperature range at which a polymeric material shows an abrupt change in its physical properties, including, for example, mechanical strength. Tg can be determined by differential scanning calorimetry (DSC). The diene rubber may have a weight average molecular weight of at least about 100,000 gram per mole (g/mole)—or a weight average molecular weight of at least about a 300,000 g/mole. The diene rubber may have a weight-average molecular weight equal to or less than about 900,000 g/mole or a weight average molecular weight equal to or less than 600,000 g/mole. The diene rubber may have a solution viscosity of at least 10 centi Stokes (cSt) (10 percent (%) solution in styrene) or a solution viscosity of at least about 30 cSt. The diene rubber may have a solution viscosity equal to or less than about 500 cSt or equal to or less than about 400 cSt. The rubber, with graft and/or occluded polymers if present, may be dispersed in the continuous matrix phase of the copolymer as discrete particles. The rubber particles may comprise a range of sizes having a mono-modal, bimodal, or multimodal distribution. The average particle size of a rubber particle, as used herein, will, refer to the volume average diameter. In most cases, the volume average diameter of a group of particles is the same as the weight average. The average particle diameter measurement generally includes the polymer grafted to the rubber particles and occlusions of polymer within the particles. Unless otherwise specified, the rubber particle sizes disclosed and claimed herein are determined on a Coulter Multisizer II or II e with the ACCUCOMP™ Software Version 2.01 by the following method: about 3 granules of polymer samples (30-70 mg) are dissolved in 5 milliliters (ml) of Dimethyl Formamide (DMF), using an ultrasonic bath for agitation for approximately 15 to 20 minutes. 10 ml or an electrolyte solution (1 percent of $NH_4SCN$ in DMF) is mixed with 0.2 ml of the sample solution. The coulter measuring stand is used with 20 micrometer Coulter tube and a 1.16 micrometer calibration material. The coincidence level indicator of the apparatus should read between 5 and 10 percent. If the reading is above 10 percent, dilute the sample in a beaker with electrolyte solution, or if it is too low, add more drops of the polymer solution in DMF. The volumetric mean particle size is reported. The average particle size of the rubber particles may be equal to or greater than about 0.05 micrometers (microns) (μm), equal to or greater than about 0.1 micrometers, and about 0.5 micrometers. The average particle size of the rubber particles may be equal to or less than about 10 micrometers, preferably equal to or less than about 5 micrometers, or equal to or less than about 4 micrometers.

The impact modifier may have a core shell rubber morphology. The impact modifier or rubber may be a core shell rubber. Any core shell rubber that improves the impact properties of the copolymer may be used. Exemplary core shell rubbers include silicone based core shell rubbers, acrylic core shell rubbers, ethylene-ethyl acrylate core shell rubbers, thermoplastic polyurethane based rubbers. The amount of such core shell rubbers and particle sizes are as disclosed herein.

The disclosed compositions may also contain one or more additives commonly used in compositions of this type. Such additives may include colorants, mold, release agents, flow modifiers, UV absorbers, light stabilizers, fillers, fibers, anti-oxidants, heat stabilizers, ignition resistant additives, antistats, silicon oils, etc. Ignition resistance additives include halogenated hydrocarbons, halogenated carbonate oligomers, halogenated diglycidyl ethers, organophosphorous compounds, fluorinated olefins, antimony oxide and metal salts of aromatic sulfur, or mixtures thereof. Compounds which stabilize mass polymerized rubber-modified vinyl or vinylidene substituted aromatic copolymer compositions against degradation caused by, but not limited to heat, light, and oxygen, or a mixture thereof may be used. Fillers and reinforcements may also be present. Exemplary fillers include talc, clay, wollastonite, mica, glass or a mixture thereof. Such additives and/or fillers may be present in the formulated compositions in an amount about 0.01 percent by weight or greater, about 0.1 percent by weight or greater, about 1 percent by weight or greater, about 2 percent by weight or greater, or about 3 percent by weight or greater based on the weight of the compositions. The additives and/or fillers may be present in an amount of about 40 percent by weight or less, about 30 percent by weight or less, about 20 percent by weight or less, about 15 percent by weight or less, about 10 percent by weight or less, about 5 percent by weight or less based on the weight of the composition. The additives may be present in amounts up to 5 weight percent while fillers may be present in amounts up to 40 weight percent based on the weight of the compositions.

Various techniques for producing the copolymers are disclosed. Examples of these known polymerization processes include bulk, mass-solution, or mass-suspension polymerization, generally known as mass polymerization processes. For a good discussion of how to make copolymer containing free radically polymerizable compounds see "Modern Styrenic Polymers" of Series In Polymer Science (Wiley), Ed. John Scheirs and Duane Priddy, ISBN 0 471 497525, incorporated herein by reference; see also, for example, U.S. Pat. Nos. 3,660,535; 3,243,481; and 4,239,863, which are incorporated herein by reference. Continuous mass polymerization techniques are advantageously employed in preparing the copolymers. The polymerization may conducted in one or more substantially linear, stratified flow or so-called "plug-flow" type reactors such as described in U.S. Pat. No. 2,727,884, sometimes referred to as multizone plug flow bulk process, which may or may not comprise recirculation of a portion of the partially polymerized product or, alternatively, in a stirred tank reactor wherein the contents of the reactor are essentially uniform throughout, which is generally employed in combination with one or more plug-flow type reactors. The stirred tank reactors can be boiling and/or coil reactors. Such reactors can be used in series. Processes for use of the stirred tank reactors for preparing copolymers are disclosed in *Modern Styrenic Polymers*, Edited by John Schiers and Duane Priddy, Wiley, ISBN 0 471 49752 5, published in 2003, see pp 43-72, relevant portions incorporated herein by reference. Alternatively, a parallel reactor set-up, as taught in EP 412801, may also be suitable for preparing the copolymers, relevant portions are incorporated herein by reference.

Multizone plug flow bulk processes include a series of polymerization vessels (or towers), consecutively connected to each other, providing multiple reaction zones. A mixture of monomers used to prepare the copolymer is formed and then fed into the reaction system. A rubber, for example butadiene rubber, may be dissolved in the mixture of monomers before being fed into the reaction system. The polymerization can be thermally or chemically initiated, and viscosity of the reaction mixture will gradually increase. During the reaction course, where present, the rubber may become grafted with the copolymer and, in the rubber solution, bulk copolymer (referred to also as free copolymer or matrix copolymer or non-grafted copolymer) is also formed. At a point where the free copolymer cannot be "held" in one single, continuous "phase" of rubber solution, it begins to form domains of copolymer dissolved in monomer and solvent. The polymerization mixture now is a two-phase system. As polymerization proceeds, more and more free copolymer is formed, and the rubber phase starts to disperse itself (rubber domains) in the matrix of the ever-growing free copolymer phase. Eventually, the free copolymer becomes a continuous phase. Some copolymer is occluded inside the rubber particles as well. Pre-phase inversion means that the rubber solution is a continuous phase and that no rubber particles are formed, and post phase inversion means that substantially all of the rubber phase has converted to rubber domains and there is a continuous copolymer phase. Following the phase inversion, more matrix copolymer may be formed A feed with a functional monomer such as N-phenyl maleimide that increases the Tg of the matrix and also the heat resistance of the product can be added in one or more location throughout the polymerization process, the location(s) may be the same or different from where the co-monomers are added, for example see U.S. Pat. Nos. 5,412,036 and 5,446,103, which are incorporated herein by reference.

A feed with a functional additive such as ethylenebisstearamide, dialkyladipates, polydimethylsiloxane, or other lubricants or release agents that increases the processability of the product can be added in one or more location throughout the polymerization, devolatilization and conveying process, the location(s) may be the same or different from where the co-monomers are added.

When a desirable monomer conversion level and a matrix copolymer of desired molecular weight distribution is obtained, where rubber is present, the polymerization mixture may then be subjected to conditions sufficient to cross-link the rubber and remove any unreacted monomer and solvent. Such cross-linking and removal of unreacted monomer, as well as removal of diluent or solvent, if employed, and other volatile materials is advantageously conducted employing conventional devolatilization techniques, such as introducing the polymerization mixture into a devolatilizing chamber, flashing off the monomer and other volatiles at elevated temperatures, for example, from 130° C. to 300° C. and/or under vacuum and removing them from the chamber. Thereafter the polymer may be extruded, and bulk pellets obtained from a pelletizer.

The temperatures at which polymerization is conducted are dependent on a variety of factors including the specific initiator and type and concentration of rubber, comonomers, reactor set-up (for example, linear, parallel, recirculation, etc.), and reaction solvent, if any, employed. Polymerization temperatures from 60° C. to 160° C. may be employed prior to phase inversion with temperatures from 100° C. to 200° C. being employed subsequent to phase inversion. Mass polymerization at such elevated temperatures may be continued until the desired conversion of monomers to polymer is obtained. Generally, conversion (also sometimes referred to as percent solids) of from 55 to 90, or 60 to 85, weight percent of the monomers added to the polymerization system (that is, monomers added in the feed and any additional stream, including any recycle stream) to polymer is desired. Percent solids is the ratio of the weight of the solids (for example, rubber plus matrix (co)polymer) to the weight of the reaction mixture (for example, unpolymerized monomer(s)) expressed in percent at any specified time during the polymerization reaction.

A polymer's molecular weight is directly related to the entanglement effects contributing to its rheological and physical properties. The molecular weight of the matrix copolymer produced in the grafting reactor during the production of the rubber-modified vinyl or vinylidene aromatic substituted copolymer can be adjusted by the addition of a suitable chain transfer agent. Chain transfer agents, or molecular weight regulators, are substances which can undergo atom or group transfer or an addition-elimination. Organic molecules with labile hydrogens and are well known, for example, alpha-methyl styrene dimer, mercaptans or thiols such as n-dodecylmercaptan (nDM) and thioglycolate, disulfides, dithiauram disulfides, monosulfides, halides or halocarbons, common solvents and certain unsaturated compounds such as allyl peroxides, allyl halides, allyl sulfides, and terpenes such as terpinoline. Also transition metal complexes as cobalt(II) porphyrin complexes can be used as chain transfer agents. Chain transfer agents are added in an amount from about 0.0001 to 10 weight percent based on the weight of the reaction mixture (that is, rubber, monomer(s), and solvent, if any). The chain transfer agent may be added in an amount equal to or greater than about 0.001 weight percent, about 0.002, or about 0.003 weight percent based on the weight of the reaction mixture. The chain transfer agent may be added in an amount equal to or less than about 0.5 weight percent, about 0.2, or about 0.1 weight percent based on the weight of the reaction mixture.

The chain transfer agent may be added all at once in one reactor zone or it may be added in two or more reactor zones. Chain transfer agent may be added before phase inversion, during rubber particle sizing, more may be added after particle sizing to help control the matrix molecular weight, and optionally more may be added later to fine tune the matrix molecular weight/molecular weight distribution. The chain transfer agent may be added at the beginning of the polymerization (in other words, at a time where the percent solids for the reaction mixture is equal to the weight percent rubber) in a first amount equal to or greater than 0.001 weight percent, from about 0.002 and about 0.1 weight percent, or from about 0.003 and about 0.05 weight percent based on the weight of the reaction mixture. The amount of chain transfer agent added later, for example after about 40 percent solids, 30 percent solids, is added in a second amount equal to or less than about 0.7 weight percent, about 0.001 to about 0.6 weight percent, or from about 0.002 to about 0.5 weight percent based on the weight of the reaction mixture. The molecular weight of the matrix copolymer depends on, among other things, how much chain transfer agent is used and when it is added.

The monomers and optionally rubber or rubber precursors in the reaction mixture may be dissolved or dispersed in an inert solvent. Useful solvent families are aromatics, ketones, alkanes. An exemplary solvent is ethyl benzene. The solids level of monomers and rubbers or rubber precursors in the solvent may be chosen to facilitate efficient formation of the copolymer and optionally dispersed rubber in the copolymer. Solids level as used in this context is the amount of the monomers and optionally rubber in the reaction mixture expressed as weight percent. The solids level of monomers and optionally rubber or rubber precursors in the reaction mixture is about 60 percent by weight or greater based on the reaction mixture, is about 65 percent by weight or greater or is about 70 percent by weight or greater. The solids level of monomers and optionally rubber or rubber precursors in the reaction mixture is about 95 percent by weight or less based on the reaction mixture, is about 90 percent by weight or less or is about 85 percent by weight or less.

The residence time of the reaction mixture in the reactors is sufficient to prepare copolymers having the desired molecular weight. The residence time of the reaction mixture in the reactors may be about 1 hour or greater, about 1.5 hours or greater or about 2 hours or greater. The residence time of the reaction mixture in the reactors may be about 10 hours or less, about 9 hours or less or about 8 hours or less. The molecular weight of the copolymer (weight average molecular weight Mw) may be about 100,000 g/Mole or greater, about 120,000 g/Mole or greater, about 130,000 g/Mole or greater or about 140,000 g/Mole or greater. The molecular weight of the copolymer may be about 400,000 g/Mole or less, about 350,000 g/Mole or less or about 325,000 g/Mole or less. Molecular weight is determined by gel permeation chromatography using polystyrene standards. The copolymers may exhibit a transparency of about 85 percent by weight or greater, 86 percent by weight or greater or about 87 percent by weight or greater. The copolymers typically exhibit a glass transition temperature of 100° C. or greater, about 110° C. or greater, about 120° C. or greater, or about 125° C. or greater. The copolymers typically exhibit a glass transition temperature of about 145° C. or less or about 140° C. or less. The copolymers containing dispersed rubber may be opaque or clear provided the ratio of the one or more mono vinyl or vinylidene aromatic compounds to the one or more cyclic (meth) acrylate esters is in an acceptable range.

The process may be performed in the presence of a radical initiator. Any radical initiator that enhances the formation of the copolymers may be used. Exemplary classes of initiators include free radical initiators such as peroxide and azo compounds which will accelerate the polymerization. Exemplary initiators include but are not limited to tertiary butyl peroxyacetate, dibenzoyl peroxide, dilauroyl peroxide, t-butylhydroperoxide, ditertiary-butylperoxide, cumene hydroperoxide, dicumylperoxide, 1,1-bis(tertiary-butylperoxy)-3,3,5-trimethyl-cyclohexane, t-butylperoxybenzoate, 1,1-bis(t-butylperoxy)-cyclohexane, benzoylperoxide, succinoylperoxide and t-butylperoxypivilate, and azo compounds such as azobisisobutyro-nitrile, azobis-2,4-dimethylvaleronitrile, azobiscyclohexanecarbo-nitrile, azobismethyl isolactate and azobiscyanovalerate. Typical amounts are well known in the art and may be used in the disclosed process. The radical initiators may be utilized in a sufficient amount to enhance the polymerization of the monomers to form a copolymer, including increasing the rate of polymerization. Initiators may be employed in a range of concentrations dependent on a variety of factors including the specific initiators employed, the desired levels of polymer grafting and the conditions at which the mass polymerization is conducted, such as from 50 to 2000, preferably from 100 to 1500, parts by weight of the initiator are employed per million parts by weight of monomers. The radical initiators may be present in an amount of about 0.001 percent by weight or greater based on the weight of the monomers present, about 0.002 percent by weight or greater or about 0.003 percent by weight or greater. The radical initiators may be present in an amount of about 0.1 percent by weight or less based on the weight of the co-monomers present, about 0.08 percent by weight or less or about 0.05 percent by weight or less.

The polymerizable composition may include a metal salt. The metal salt may reduce the temperature at which the impact modified system may be formed. The metal salt may function as a catalyst for reaction of the electrophilic groups with the nucleophilic groups. Any metal salt that catalyzes or reduces the temperature required for formation of the impact modified system may be utilized. The metal salt may be the salt of a transition metal, an alkali metal, an alkaline earth metal, a post transition metal or a metalloid. The metal in the salt may be zinc, zirconium, aluminum, calcium, sodium, copper, magnesium or mixtures thereof. The metal in the salt may be zinc. The metal may form a salt with an acetate, carbonate, bicarbonate, methacrylate, fumarate counter ion, or mixtures thereof. The metal may form a salt with an acetate counter ion. The metal salt may be zinc acetate, zinc acetate dihydrate, zinc carbonate, and the like.

The metal salt may be present in a sufficient amount to catalyze or reduce the temperature required for formation of the impact modified system. The metal salt may be present in the reactive composition in an amount of about 10 ppm or greater based on the weight of the composition, about 50 ppm by weight or greater or about 100 ppm or greater. The metal salt may be present in the reactive composition in an amount of about 5000 ppm by weight or less based on the weight of the composition, about 3000 ppm by weight or less or about 1000 ppm by weight or less. The metal salt may be present in and part of the reacted materials.

Disclosed is a method of preparing an impact modified composition comprising: contacting a) one or more copolymers of one or more vinyl or vinylidene aromatic monomers and/or one or more (meth)acrylates and one or more unsaturated compounds containing nucleophilic groups; b) one or more thermoplastic elastomers containing one or more nucleophilic groups; and, c) the one or more polymers having electrophilic groups are present in an amount of about 0.01 to about 25 percent by weight. The amounts of the ingredients are as disclosed hereinbefore. Process may be performed at a temperature of about 200° C. to about 300° C. for a time period of about 0.5 to about 5 minutes; such that the electrophilic groups react with the nucleophilic groups and at least a portion of the one or more copolymers containing nucleophilic groups are bonded to at least a portion of the one or more thermoplastic elastomers containing one or more nucleophilic groups by at least a portion of the one or more polymers having electrophilic groups.

The reactants may be contacted using any method wherein the impact modified system is prepared. Exemplary methods include melt blending, extrusion, injection molding, foam extrusion, sheet extrusion, and the like. Exemplary methods include melt blending. The temperature for reacting the reactants is selected such that nucleophilic groups react with the electrophilic groups. The reactants may be contacted at a temperature of about 200° C. or greater, or about 220° C. or greater, or about 230° C. or greater. The reactants may be contacted at a temperature of about 260° C. or less, or about 250° C. or less, or about 245° C. or less. The contacting time at the stated temperatures is selected such that the nucleophilic groups react with the electrophilic groups. The contacting time of the reactants may be about 0.5 minutes or greater, about 0.6 minutes or greater or about 0.7 minutes or greater. The contacting time of the reactants may be about 10 minutes or less, about 5.0 minutes or less or about 3.0 minutes or less. The reactants may be melt-blended in an extruder, mixer, and the like. To facilitate formation of the impact modified systems it may be desirable to react the reactants at the specific energy values. The copolymers may be reacted under conditions such that the specific energy values are greater than 400 J/g or 700 J/g.

The impact modified systems disclosed may be blended with thermoplastic polymers. The thermoplastic polymers may be any thermoplastic polymers which form a useful blend with the copolymers. The thermoplastic polymers can be any polymers that are transparent. Exemplary thermoplastic polymers include poly(meth)acrylates, polycarbonates, polyesters, polymers containing vinyl or vinylidene substituted aromatic monomers, and the like. Examples of the thermoplastic polymers include polymethyl methacrylate, polystyrene, acrylonitrile-butadiene-styrene, styrene acrylonitrile, polybutyl acrylate, and the like. The amount of the impact modified polymer systems disclosed, and other thermoplastic polymers are chosen to provide the desired properties. The amount of the impact modified polymer systems disclosed in the blend may be about 99.5 percent by weight or less based on the weight of the blend, about 70 percent by weight or less or about 60 percent by weight or less. The amount of the impact modified polymer systems in the blend may be about 50 percent by weight or greater based on the weight of the blend or about 60 percent by weight or greater. The amount of thermoplastic polymers disclosed in the blend may be about 50 percent by weight or less based on the weight of the blend, about 40 percent by weight or less or about 30 percent by weight or less. The amount of thermoplastic polymers disclosed in the blend may be about 0.5 percent by weight or greater based on the weight of the blend, about 10 percent by weight or greater or about 30 percent by weight or greater. The blends may be formed by mixing or extrusion.

The final form of the product can be granules useful in further processes, such as forming extruded foams and sheets. Common additives used in the disclosed compositions may include fire retardants, nucleating agents, blowing agents, flow promoters, process aids, fibers, fillers, UV stabilizers, antioxidants, thermal stabilizers, colorants, blends of other polymers, etc. The pellets of the formulated composition may be extruded to form sheets. The sheets may be thermoformed into shaped articles. Alternatively, the formulated compositions may be molded into articles.

Embodiments 1. A composition comprising:
a) one or more copolymers of i) one or more of vinyl or vinylidene aromatic monomers and/or one or more (meth)acrylates; with ii) one or more unsaturated compounds containing one or more nucleophilic groups wherein the copolymer contains on average about 0.01 to about 5.0 percent by weight of nucleophilic groups based on the weight of the copolymer; b) one or more thermoplastic elastomer based polymers containing one or more nucleophilic groups; and
c) one or more polymers having electrophilic groups; wherein the electrophilic groups are reactive with the nucleophilic groups.

2. A composition according to Embodiment 1 wherein
a) one or more copolymers of i) one or more of vinyl or vinylidene aromatic monomers and/or one or more (meth)acrylates; with ii) one or more unsaturated compounds containing one or more nucleophilic groups are present in an amount of about 20 to about 99 percent by weight;
b) the one or more thermoplastic elastomers containing one or more nucleophilic groups are present in an amount of about 1 to about 80 percent by weight; and,
c) the one or more polymers having electrophilic groups are present in an amount of about 0.01 to about 25 percent by weight; wherein the percent by weights are based on the total weight of the polymers and copolymers.

3. A composition according to Embodiments 1 or 2 wherein the one or more thermoplastic elastomer-based polymers containing one or more nucleophilic groups contains on average about 0.01 to about 20.0 percent by weight of nucleophilic groups.

4. A composition according to any one of the preceding Embodiments wherein the nucleophilic groups are pendant from or at the terminal ends, or both pendant from and at the terminal ends of polymer chains of the polymers and copolymers.

5. A composition according to any one of the preceding Embodiments wherein the nucleophilic groups are one or more of alkyl carboxylate, carboxylic acid, alcohol, phenol, amine, aniline, imidazole, tetrazole, thiol, boronic acid, glycol, hydrazine and hydroxyl amine groups.

6. A composition according to any one of the preceding Embodiments wherein the electrophilic groups are one or more of epoxide, anhydride, imide, ester, acyl halide, acyl nitrile, aldehyde, ketone, isocyanate and isothiocyanate groups.

7. A composition according to any one of the preceding Embodiments wherein the nucleophilic groups are one or more of alkyl carboxylate, carboxylic acid, amine or hydroxyl groups.

8. A composition according to any one of the preceding Embodiments wherein the electrophilic groups are one or more epoxide groups.

9. A composition according to any one of the preceding Embodiments wherein the one or more unsaturated compounds containing one or more nucleophilic groups comprise one or more unsaturated acids, amines, and unsaturated alkyl carboxylates.

10. A compositions according to any one of the preceding Embodiments wherein the one or more unsaturated carboxylic acids comprise acrylic acid, methacrylic acid, 4-vinyl benzoic acid, maleic acid, fumaric acid or mixtures thereof.

11. A composition according to any one of the preceding Embodiments wherein the unsaturated alkyl carboxylates comprise one or more alkyl (meth)acrylates.

12. A composition according to any one of the preceding Embodiments wherein the copolymer containing one or more nucleophilic group contains from about 0.05 to about 1.5 percent by weight nucleophilic groups.

13. A composition according to any one of the preceding Embodiments wherein the thermoplastic elastomer-based polymer containing one or more nucleophilic group contains from about 0.5 to about 1.5 percent by weight nucleophilic groups.

14. A composition according to any one of the preceding Embodiments wherein the polymer containing one or more electrophilic group contains from about 1 to about 50 percent by weight electrophilic groups based on the weight of the polymer.

15. A composition according to any one of the preceding Embodiments which contains one or more catalysts for the reaction of the nucleophilic groups with the electrophilic groups.

16. A composition of Embodiments 15 wherein the one or more catalysts comprise a salt of a transition metal, an alkali metal, an alkaline earth metal, a post transition metal or a metalloid.

17. A composition of Embodiments 16 wherein the metal is zinc, zirconium, aluminum, calcium, sodium, copper, magnesium or mixtures thereof.

18. A composition of Embodiments 15 or 16 wherein the transition metal, alkali metal, the earth alkali metal, the post transition metal or the metalloid forms a salt with an acetate, carbonate, bicarbonate, methacrylate, fumarate or mixtures thereof.

19. A composition according to any one of Embodiments 15 to 18 wherein the one or more catalysts are present in an amount of about 0.0005 to about 5.0 percent by weight based on the amount of polymers and copolymers present.

20. A composition according to any one of the preceding Embodiments wherein the one or more copolymers are one or more copolymers of one or more vinyl or vinylidene aromatic monomers and one or more unsaturated acids.

21. The composition according to any one of the preceding Embodiments wherein the copolymer of the one or more vinyl or vinylidene aromatic monomers and one or more unsaturated acids may further comprise one or more (meth)acrylates, unsaturated nitriles or conjugated dienes.

22. The composition according to any one of the preceding Embodiments wherein the one or more copolymers are copolymers of one or more vinyl or vinylidene aromatic monomers, one or more cyclic (meth)acrylates and one or more of unsaturated acids and/or unsaturated alkyl carboxylates.

23. The composition according to any one of the preceding Embodiments wherein the (meth)acrylate is one or more of cyclic (meth)acrylates or alkyl (meth)acrylates.

24. The composition according to any one of the preceding Embodiments wherein the one or more copolymers are copolymers of one or more one or more cyclic (meth)acrylates, one or more alkyl (meth)acrylates and, optionally, one or more unsaturated acids.

25. The composition according to Embodiment 24 wherein the one or more alkyl (meth)acrylates contain one or more alkyl methacrylates and one or more alkyl acrylates.

26. The composition according to Embodiments 25 wherein the one or more alkyl (meth)acrylates contain methyl methacrylate and butyl acrylate.

27. The composition according to any one of the preceding Embodiments wherein the cyclic or polycyclic groups of the cyclic (meth)acrylate esters are aliphatic.

28. The composition according to any one of the preceding Embodiments wherein the cyclic (meth)acrylate esters comprise one or more of cyclohexyl (meth)acrylate, adamantyl (meth)acrylate, norbornyl (meth)acrylate and isobornyl (meth)acrylate.

29. The composition according to any one of the preceding Embodiments wherein the cyclic (meth)acrylate esters comprise isobornyl (meth)acrylate.

30. The composition according to any one of the preceding Embodiments wherein the one or more thermoplastic elastomer-based polymers containing one or more nucleophilic groups comprise one or more thermoplastic copolymers containing one or more nucleophilic groups.

31. The composition according to any one of the preceding Embodiments wherein the one or more thermoplastic elastomer-based polymers containing one or more nucleophilic groups comprise one or more of polyetheramides, styrenic block copolymers, acrylic block copolymers, thermoplastic polyurethanes and thermoplastic copolyesters.

32. The composition according to any one of the preceding Embodiments wherein the one or more polymers having electrophilic groups comprise one or more copolymers of one or more vinyl or vinylidene aromaticmonomers and one or more unsaturated compounds having electrophilic groups, (meth)acrylic copolymers and styrene-glycidyl methacrylate copolymers.

33. The composition according to any one of the preceding Embodiments wherein the one or more polymers having electrophilic groups comprise one or more of (meth)acrylic copolymers and styrene-glycidyl methacrylate copolymers, olefin-(meth)acrylic ester-glycidyl (meth)acrylate terpolymers, and olefin-glycidyl (meth)acrylate copolymers.

34. A composition comprising:
a) one or more copolymers of i) one or more of vinyl or vinylidene aromatic monomers and/or one or more (meth) acrylates; with ii) one or more unsaturated compounds containing one or more nucleophilic groups wherein the copolymer contains on average about 0.01 to about 5.0 percent by weight of nucleophilic groups based on the weight of the copolymer;
b) one or more thermoplastic elastomer based polymers containing one or more nucleophilic groups; and
c) one or more polymers having electrophilic groups;
wherein the electrophilic groups have reacted with the nucleophilic groups and at least a portion of the one or more copolymers containing nucleophilic groups are bonded to at least a portion of the one or more thermoplastic elastomers containing one or more nucleophilic groups by at least a portion of the one or more polymers having electrophilic groups.

35. A composition according to Embodiment 34 wherein
a) one or more copolymers of i) one or more of vinyl or vinylidene aromatic monomers and/or one or more (meth) acrylates; with ii) one or more unsaturated compounds containing one or more nucleophilic groups are present in an amount of about 20 to about 99 percent by weight;
b) the one or more thermoplastic elastomers containing one or more nucleophilic groups are present in an amount of about 1 to about 80 percent by weight; and,
c) the one or more polymers having electrophilic groups are present in an amount of about 0.01 to about 25 percent by weight;
wherein the percent by weights are based on the total weight of the polymers and copolymers.

36. A composition according to Embodiments 34 or 35 wherein the one or more thermoplastic elastomer-based polymers containing one or more nucleophilic groups contain on average about 0.01 to about 5.0 percent by weight of nucleophilic groups.

37. A composition according to any one of Embodiments 34 to 36 wherein the nucleophilic groups are pendant from or at the terminal ends, or both pendant from and at the terminal ends of polymer chains of the polymers and copolymers.

38. A composition according to any one of Embodiments 34 to 37 wherein the nucleophilic groups are one or more of alkyl carboxylates, carboxylic acid, alcohol, phenol, amine, aniline, imidazole, tetrazole, thiol, boronic acid, glycol, hydrazine and hydroxyl amine groups.

39. A composition according to any one of Embodiments 34 to 38 wherein the electrophilic groups are one or more of epoxide, anhydride, imide, ester, acyl halide, acyl nitrile, aldehyde, ketone, isocyanate and isothiocyanate groups.

40. A composition according to any one of Embodiments 34 to 39 wherein the nucleophilic groups are one or more of alkyl carboxylates, carboxylic acid, amine or hydroxyl groups.

41. A composition according to any one of Embodiments 34 to 40 wherein the electrophilic groups are one or more of epoxide groups.

42. A composition according to any one of Embodiments 34 to 41 wherein the one or more unsaturated compounds containing one or more nucleophilic groups comprise one or more unsaturated acids, amines, and unsaturated alkyl carboxylates.

43. A compositions according to any one of any one of Embodiments 34 to 42 wherein the one or more unsaturated carboxylic acids comprise acrylic acid, methacrylic acid, 4-vinyl benzoic acid, maleic acid, fumaric acid or mixtures thereof.

44. A composition according to any one of any one of Embodiments 34 to 43 wherein unsaturated alkyl carboxylates comprise one or more alkyl (meth)acrylates.

45. A composition according to any one of Embodiments 34 to 44 wherein the copolymer containing one or more nucleophilic group contains from about 0.05 to about 1.5 percent by weight nucleophilic groups.

46. A composition according to any one of Embodiments 34 to 45 wherein the thermoplastic elastomer-based polymer containing one or more nucleophilic group contains from about 0.5 to about 1.5 percent by weight nucleophilic groups.

47. A composition according to any one of Embodiments 34 to 46 wherein the polymer containing one or more electrophilic group contains from about 1 to about 50 percent by weight electrophilic groups based on the weight of the polymer.

48. A composition according to any one of Embodiments 34 to 47 wherein the one or more copolymers is a copolymer of one or more vinyl or vinylidene aromatic monomers and one or more unsaturated acids.

49. The composition according to any one of Embodiments 34 to 48 wherein the copolymer contains comprise one or more (meth)acrylates, unsaturated nitriles or conjugated dienes.

50. The composition according to any one of Embodiments 34 to 49 wherein the one or more copolymers is a copolymer of one or more vinyl or vinylidene aromatic-monomers, one or more cyclic (meth)acrylates and one or more unsaturated acids.

51. The composition according to any one of Embodiments 34 to 50 wherein the one or more (meth)acrylates may be one or more cyclic (meth)acrylates and/or one or more alkyl (meth)acrylates.

52. The composition according to any one of Embodiments 34 to 51 wherein the one or more copolymers is a copolymer of one or more of one or more cyclic (meth) acrylates, one or more alkyl (meth)acrylates and/or one or more unsaturated acids.

53. The composition according to any one of Embodiments 34 to 52 wherein the one or more copolymers is a copolymer of one or more one or more cyclic (meth) acrylates, one or more alkyl (meth)acrylates and one or more unsaturated acids.

54. The composition according to any one of Embodiments 34 to 53 wherein the one or more alkyl (meth) acrylates contain one or more alkyl methacrylates and one or more alkyl acrylates.

55. The composition according to Embodiments 54 wherein the one or more alkyl (meth)acrylates contain methyl methacrylate and butyl acrylate.

56. The composition according to any of Embodiments 34 to 55 wherein the cyclic or polycyclic groups of the cyclic (meth)acrylate esters are aliphatic.

57. The composition according to any of Embodiments 34 to 56 wherein the cyclic (meth)acrylate esters comprise one or more of cyclohexyl (meth)acrylate, adamantyl (meth) acrylate, norbornyl (meth)acrylate and isobornyl (meth) acrylate.

58. The composition according to any of Embodiments 34 to 57 wherein the cyclic (meth)acrylate esters comprise isobornyl (meth)acrylate.

59. The composition according to any of Embodiments 34 to 58 containing one or more of a salt of a transition metal, an alkali metal, an alkaline earth metal, a post transition metal or a metalloid.

60. A method of preparing a composition according to any one of Embodiments 34 to 59 comprising: contacting a) the one or more copolymers in an amount of about 20 to about 99 percent by weight;
b) the one or more thermoplastic elastomers containing one or more nucleophilic groups present in an amount of about 1 to about 80 percent by weight; and,
c) the one or more polymers having electrophilic groups are present in an amount of about 0.01 to about 25 percent by weight;
at a temperature of about 200° C. to about 300° C. for a time period of about 0.5 to about 5 minutes; such that the electrophilic groups react with the nucleophilic groups and at least a portion of the one or more copolymers are bonded to at least a portion of the one or more thermoplastic elastomers containing one or more nucleophilic groups by at least a portion of the one or more polymers having electrophilic groups.

61. A method according Embodiments 60 wherein the copolymers and the polymers are contacted in the presence of a catalyst for the reaction of nucleophilic groups with electrophilic groups.

62. A method according Embodiments 61 wherein catalyst for the reaction of nucleophilic groups with electrophilic groups comprises one or more of a salt of a transition metal, an alkali metal, an alkaline earth metal, a post transition metal or a metalloid.

63. A method according Embodiments 62 wherein the metal is zinc, zirconium, aluminum, calcium, sodium, copper, magnesium or mixtures thereof.

64. A method according to any one of Embodiments 61 to 63 wherein the metal forms a salt with an acetate, carbonate, bicarbonate, (meth)acrylate, fumarate or mixtures thereof.

65. A method according to any one of Embodiments 60 to 64 wherein the copolymers are contacted at a temperature of about 200° C. to about 260° C. for a time period of about 0.5 to about 3.0 minutes.

66. A method according to any one of Embodiments 60 to 65 wherein the metal salt is added to the melt blend at a concentration of about 50 ppm to about 5000 ppm based on the weight of the copolymers reacted.

67. A method according to any one of Embodiments 60 to 65 wherein a) the one or more copolymers containing nucleophilic groups b) the one or more thermoplastic elastomers containing one or more nucleophilic groups; and, c) the one or more polymers having electrophilic groups; are contacted under shear.

Illustrative Embodiments

The following examples are provided to illustrate the invention but are not intended to limit the scope thereof. All parts and percentages are by weight unless otherwise indicated.

Ingredients

Polymer with electrophilic groups (P-EG) is a copolymer of ethylene/methyl acrylate/glycidyl methacrylate (E-MA-GMA) that contains 24 wt % methyl acrylate and 8 wt % glycidyl methacrylate Thermoplastic elastomers (TPE-X) are poly(ether-block-amide) block copolymers obtained by polycondensation of carboxylic acid terminated polyamide blocks with polyoxyalkylene glycol blocks. Their structural analysis and properties are reported in Polymer 44 (2003) 743-756, incorporated herein by reference.

TPE-1 has Shore D hardness 40 and contains the residue of about 70.4 mole percent polyether, about 27.15 mole percent polyamide and about 2.45 mole percent adipic acid.

TPE-2 has Shore D hardness 55 and contains the residue of about 47 mole percent polyether.

TPE-3 has Shore D hardness 63 and contains the residue of about 36.9 mole percent polyether, about 60.5 mole percent polyamide and about 2.6 mole percent adipic acid TPE-4 has Shore D hardness 70 and contains the residue of about 24.8 mole percent polyether, about 73.0 mole percent polyamide and about 2.2 mole percent adipic acid.

TPE-5 has Shore D hardness 72 and contains the residue of about 20 mole % polyether. IBOMA/MMA is a copolymer containing 50 percent (%) by weight of each of isobornyl methacrylate and methyl methacrylate.

IBOMA/MMA/AA is a copolymer containing acrylic acid that is either 1.0% or 0.05% by weight of the copolymer. In both cases weight ratio of isobornyl methacrylate and methyl methacrylate is equal to 1.

Reaction Procedures.

IBOMA/MMA and IBOMA/MMA/AA are prepared via free radical polymerization in a multi-zone plug-flow reactor system as described in EP Patent application 19184657.5 incorporated herein by reference. The above copolymers are reacted with one or more of a thermoplastic elastomer (TPE) and/or a polymer with electrophilic groups (P-EG) under the following conditions. The reactants are melt blended in the presence of zinc acetate (Zn(OAc)$_2$) at 230° C. for 60 seconds or 120 seconds, unless otherwise stated. The extruded polymer is injection molded into tensile bars which are then subjected to mechanical tests to determine the impact and tensile properties of these polymers.

Methods

Izod Impact strength (notched or unnotched) is determined according to ISO 180.

Unnotched Charpy impact strength is determined according to ISO 179/1eU

Notched Charpy impact strength is determined according to ISO 179/1eA

The dimensions of the V-shape notch type A is as follows. Notch angle: 45°±1°, notch base radius: 0.25±0.05 mm, notch depth, defined as remaining sample width (b) at the notch base: 8.0±0.2 mm.

Tensile properties (Yield stress, Rupture stress, Elongation at yield, Elongation at rupture, Tensile modulus) are determined according to ISO 527-2

Vicat softening temperature is determined according to ISO 306 A120.

Example 1

IBOMA-MMA-AA copolymers are melt blended with TPE-1 and/or P-EG in the presence of Zn(OAc)$_2$. The amounts of the ingredients tested are shown in Table 1. Blending IBOMA-MMA copolymer with only TPE-1 or only the P-EG does not increase the impact strength significantly whereas combination of these two components results in up to 700% increase in Izod impact strength when measured on both notched and unnotched specimens. Table 2 shows the properties of different blends with IBOMA-MMA-AA with TPE-1 and/or P-EG at different compositions.

TABLE 1

| | Composition | | | | | Reaction |
|---|---|---|---|---|---|---|
| Sample Code | IBOMA-MMA(-AA) wt %[a] | AA wt %[b] | TPE-1 wt %[a] | P-EG wt %[a] | Zn(OAc)$_2$ wt %[a] | Extr. Time seconds[c] |
| 1-A | 62.0 | 0 | 30 | 7.5 | 0.5 | 120 |
| 1-B | 62.0 | 1 | 30 | 7.5 | 0.5 | 120 |
| 1-C | 62.0 | 1 | 30 | 7.5 | 0.5 | 60 |
| 1-D | 64.5 | 1 | 30 | 5 | 0.5 | 120 |
| 1-E | 67.0 | 1 | 25 | 7.5 | 0.5 | 120 |
| 1-F | 69.5 | 1 | 25 | 5 | 0.5 | 120 |
| 1-G | 69.5 | 1 | 30 | 0 | 0.5 | 120 |
| 1-H | 92.0 | 1 | 0 | 7.5 | 0.5 | 120 |

[a]based on the total composition
[b]based on the weight of IBOMA-MMA-(-AA) copolymer
[c]residence time in double screw extruder at 230° C.

TABLE 2

| Test | Sample | | | | | | | |
|---|---|---|---|---|---|---|---|---|
| Units | 1-A | 1-B | 1-C | 1-D | 1-E | 1-F | 1-G | 1-H |
| Izod Impact Notched-Kj/m$^2$ | 7.6 | 7.6 | 6.8 | 5.7 | 4.0 | 2.9 | 2.0 | 1.1 |
| Izod Impact Unnotched-Kj/m$^2$ | 47.0 | 50.6 | 60.1 | 38.0 | 18.9 | 17.2 | 14.5 | 6.6 |
| Yield Stress N/mm$^2$ | 29.3 | 30.1 | 28.3 | 29.2 | 34.5 | 36.7 | — | — |
| Rupture Stress N/mm$^2$ | 27.7 | 26.7 | 23.1 | 26.9 | 32.6 | 35.0 | 29.2 | 31.4 |
| Elongation at yield % | 6.6 | 5.7 | 5.0 | 6.7 | 4.7 | 4.5 | — | — |
| Elongation at rupture % | 28.8 | 34.5 | 27.2 | 13.2 | 7.4 | 6.8 | 3.6 | 1.3 |
| Tensile Modulus N/mm$^2$ | 1076 | 1024 | 960 | 975 | 1183 | 1267 | 1470 | 1261 |
| Vicat (120° C./h-10N) - ° C. | 115 | 114 | 98 | 115 | 112 | 117 | 118 | 115 |

Example 2

IBOMA-MMA copolymers are melt blended with TPE-1 and P-EG (10% by weight) in the presence of Zn(OAc)$_2$ (0.5% by weight) at 230° C. for 120 seconds. The amount of TPE-1 is varied as 20%, 25% and 30% by weight while keeping the P-EG fixed at 10% by weight or the amount of TPE-1 is fixed at 30% by weight and the amount of P-EG is varied as 5%, 7.5% and 10% by weight. Compositions of samples 2-A, 2-B, 2-C, 2-D and 2-E are given in Table 3. The extruded polymers are injection molded into tensile bars which are then subjected to mechanical tests to determine the impact and tensile properties of these polymers. Table 4 summarizes results which show that increasing the amounts of TPE-1 and P-EG increase the Charpy impact and tensile strength significantly.

TABLE 3

| | Composition | | | | | | Reaction |
|---|---|---|---|---|---|---|---|
| Sample Code | IBOMA-MMA-(AA) wt %[a] | AA wt %[b] | TPE wt %[a] | TPE-X | P-EG wt %[a] | Zn(OAc)$_2$ wt %[a] | Extr. Time seconds[c] |
| 2-A | 69.5 | 0 | 20 | TPE-1 | 10 | 0.5 | 120 |
| 2-B | 64.5 | 0 | 25 | TPE-1 | 10 | 0.5 | 120 |
| 2-C | 59.5 | 0 | 30 | TPE-1 | 10 | 0.5 | 120 |
| 2-D | 62.0 | 0 | 30 | TPE-1 | 7.5 | 0.5 | 120 |
| 2-E | 64.5 | 0 | 30 | TPE-1 | 5 | 0.5 | 120 |

[a]based on the total composition
[b]based on the weight of IBOMA-MMA-(AA) copolymer
[c]residence time in double screw extruder at 230° C.

TABLE 4

| Test Units | Sample | | | | |
|---|---|---|---|---|---|
| | 2-A | 2-B | 2-C | 2-D | 2-E |
| Charpy Impact Notched-Kj/m$^2$ | 2.3 | 3.1 | 9.7 | 6.3 | 3.6 |
| Charpy Impact Unnotched-Kj/m$^2$ | 9.3 | 18.0 | 94.8 | 32.4 | 9.0 |
| Yield Stress N/mm$^2$ | 37.0 | 32.1 | 27.5 | 29.7 | 33.5 |
| Rupture Stress N/mm$^2$ | 36.0 | 25.2 | 25.2 | 24.7 | 31.2 |
| Elongation at yield % | 4.9 | 5.5 | 7.7 | 6.5 | 6.1 |
| Elongation at rupture % | 5.8 | 30.3 | 70.4 | 40.2 | 15.7 |
| Tensile Modulus N/mm$^2$ | 1418 | 1135 | 943 | 1089 | 1224 |

Example 3

IBOMA-MMA copolymers are melt blended with different TPEs (30% by weight) and the P-EG (7.5% by weight) in the presence of Zn(OAc)$_2$ (0.5% by weight) at 230° C. with two different extrusion times (60 seconds and 120 seconds). The composition in this set of experiments is kept constant to compare different TPEs with different Shore D hardness for two different extrusion times (Table 5). Mechanical properties of TPEs change depending on their Shore D hardness which also influences the mechanical properties of the blend. TPE-2 shows the highest notched and unnotched Charpy impact strength at 23° C. when extruded for 120 seconds. Increasing the Shore D hardness of the TPE increases the modulus but decreases the elongation of the blend. TPE-3 at 120 s extrusion time showed the best elongation and modulus balance. Table 6 summarizes results for Samples 3-A, 3-B, 3-C, 3-D, 3-E, 3-F, 3-G, 3-H and 3-I.

TABLE 5

| Sample Code | Composition | | | | | | Reaction |
|---|---|---|---|---|---|---|---|
| | IBOMA-MMA-(AA) wt %[a] | AA wt %[b] | TPE wt %[a] | TPE-X | PEG wt %[a] | Zn(OAc)$_2$ wt %[a] | Extr. Time seconds[c] |
| 3-A | 62 | 0 | 30 | TPE-1 | 7.5 | 0.5 | 120 |
| 3-B | 62 | 0 | 30 | TPE-2 | 7.5 | 0.5 | 120 |
| 3-C | 62 | 0 | 30 | TPE-3 | 7.5 | 0.5 | 120 |
| 3-D | 62 | 0 | 30 | TPE-4 | 7.5 | 0.5 | 120 |
| 3-E | 62 | 0 | 30 | TPE-1 | 7.5 | 0.5 | 60 |
| 3-F | 62 | 0 | 30 | TPE-2 | 7.5 | 0.5 | 60 |
| 3-G | 62 | 0 | 30 | TPE-3 | 7.5 | 0.5 | 60 |
| 3-H | 62 | 0 | 30 | TPE-4 | 7.5 | 0.5 | 60 |
| 3-I | 62 | 0 | 30 | TPE-5 | 7.5 | 0.5 | 60 |

[a]based on the total composition
[b]based on the weight of IBOMA-MMA-(AA) copolymer
[c]residence time in double screw extruder at 230° C.

TABLE 6

| Test Units | Sample | | | | | | | | |
|---|---|---|---|---|---|---|---|---|---|
| | 3-A | 3-B | 3-C | 3-D | 3-E | 3-F | 3-G | 3-H | 3-I |
| Charpy Impact Notched-Kj/m$^2$ | 6.3 | 7.2 | 6.5 | 4.9 | 6.9 | 5.8 | 4.2 | 4.0 | 2.7 |
| Charpy Impact Unnotched-Kj/m$^2$ | 32.4 | 64.6 | 47.3 | 22.2 | 65.3 | 31.2 | 22.7 | 18.8 | 14.0 |
| Yield Stress N/mm$^2$ | 29.7 | 33.6 | 37.9 | 43.4 | 18.7 | 32.4 | 36.9 | 40.4 | 42.7 |
| Rupture Stress N/mm$^2$ | 24.7 | 31.2 | 34.6 | 39.6 | 27.1 | 31.2 | 35.9 | 39.7 | 42.0 |
| Elongation at yield % | 6.5 | 10.1 | 10.3 | 9.2 | 8.2 | 10.2 | 10.3 | 9.5 | 6.4 |
| Elongation at rupture % | 40.2 | 45.4 | 55.1 | 36.4 | 24.4 | 33.9 | 18.9 | 12.2 | 9.3 |
| Tensile Modulus N/mm$^2$ | 1089 | 1106 | 1224 | 1412 | 1022 | 1114 | 1284 | 1407 | 1559 |

Example 4

IBOMA-MMA-AA (AA: 500 ppm) copolymers are melt blended with different TPEs (30% by weight) and the P-EG (7.5% or 10% by weight) in the presence of Zn(OAc)$_2$ (0.5% by weight) at 230° C. for 60 seconds (Table 7). Table 8 summarizes results which in comparison with results summarized in Table 6 show that IBOMA-MMA copolymer results in better mechanical properties.

TABLE 7

| Sample Code | IBOMA-MMA-(AA) wt %$^a$ | AA wt %$^b$ | TPE wt %$^a$ | TPE-X | PEG wt %$^a$ | Zn(OAc)$_2$ wt %$^a$ | Reaction Extr. Time seconds$^c$ |
|---|---|---|---|---|---|---|---|
| 4-A | 62.0 | 0.05 | 30 | TPE-1 | 7.5 | 0.5 | 60 |
| 4-B | 62.0 | 0.05 | 30 | TPE-2 | 7.5 | 0.5 | 60 |
| 4-C | 62.0 | 0.05 | 30 | TPE-3 | 7.5 | 0.5 | 60 |
| 4-D | 62.0 | 0.05 | 30 | TPE-4 | 7.5 | 0.5 | 60 |
| 4-E | 62.0 | 0.05 | 30 | TPE-5 | 7.5 | 0.5 | 60 |
| 4-F | 59.5 | 0.05 | 30 | TPE-1 | 10 | 0.5 | 60 |
| 4-G | 59.5 | 0.05 | 30 | TPE-3 | 10 | 0.5 | 60 |
| 4-H | 59.5 | 0.05 | 30 | TPE-5 | 10 | 0.5 | 60 |

$^a$based on the total composition
$^b$based on the weight of IBOMA-MMA-(AA) copolymer
$^c$residence time in double screw extruder at 230° C.

TABLE 8

| Test Units | 4-A | 4-B | 4-C | 4-D | 4-E | 4-F | 4-G | 4-H |
|---|---|---|---|---|---|---|---|---|
| Charpy Impact Notched-Kj/m$^2$ | 7.3 | 5.2 | 4.2 | 3.9 | 3.3 | 8.8 | 4.8 | 3.9 |
| Charpy Impact Unnotched-Kj/m$^2$ | 52.9 | 25.6 | 23.4 | 19.7 | 16.4 | 83.8 | 29.3 | 21.5 |
| Yield Stress N/mm$^2$ | 28.6 | 21.0 | 36.7 | 39.0 | 42.0 | 26.2 | 33.6 | 38.3 |
| Rupture Stress N/mm$^2$ | 26.7 | 31.0 | 36.1 | 38.9 | 41.7 | 25.3 | 32.6 | 38.1 |
| Elongation at yield % | 7.6 | 9.9 | 10.9 | 9.7 | 6.7 | 10.6 | 10.1 | 7.3 |
| Elongation at rupture % | 28.1 | 28.6 | 20.0 | 13.3 | 8.8 | 40.1 | 33.5 | 15.6 |
| Tensile Modulus N/mm$^2$ | 1057 | 1130 | 1296 | 1411 | 1555 | 876 | 1106 | 1354 |

The invention claimed is:

1. A composition comprising:
   a) one or more copolymers of i) one or more vinyl or vinylidene aromatic monomers and/or one or more (meth)acrylates; with ii) one or more unsaturated compounds containing one or more nucleophilic groups wherein the one or more copolymers contain on average about 0.01 to about 5.0 percent by weight of the one or more nucleophilic groups based on the weight of the one or more copolymers, the one or more copolymers having a Tg of greater than 100° C.;
   b) one or more thermoplastic elastomers containing one or more nucleophilic groups; and
   c) one or more polymers containing one or more electrophilic groups;
   wherein the one or more electrophilic groups are reactive with the one or more nucleophilic groups.

2. The composition according to claim 1 comprising:
   about 20 to about 99 percent by weight of a) the one or more copolymers of i) one or more vinyl or vinylidene aromatic monomers and/or one or more (meth)acrylates; with ii) one or more unsaturated compounds containing one or more nucleophilic groups;
   about 1 to about 80 percent by weight of b) the one or more thermoplastic elastomers containing one or more nucleophilic groups; and,
   about 0.01 to about 25 percent by weight of c) the one or more polymers having electrophilic groups;
   wherein the percent by weights are based on the total weight of the one or more polymers, the one or more copolymers and the one or more thermoplastic elastomers.

3. The composition according to claim 1 wherein the one or more thermoplastic elastomers contain one or more nucleophilic groups contains on average about 0.01 to about 5.0 percent by weight of the one or more nucleophilic groups based on the weight of the one or more thermoplastic elastomers.

4. The composition according to claim 1 wherein the one or more nucleophilic groups are one or more of carboxylate, carboxylic acid, alcohol, phenol, amine, aniline, imidazole, tetrazole, thiol, boronic acid, glycol, hydrazine and hydroxyl amine groups.

5. The composition according to claim 1 wherein the one or more electrophilic groups are one or more of epoxide, anhydride, imide, ester, acyl halide, acyl nitrile, aldehyde, ketone, isocyanate and isothiocyanate groups.

6. The composition according to claim 1 wherein the polymer containing one or more electrophilic groups contain from about 1 to about 50 percent by weight of the one or more electrophilic groups based on the weight of the polymer.

7. The composition according to claim 1, wherein the composition contains one or more catalysts for the reaction of the one or more nucleophilic groups with the one or more electrophilic groups.

8. The composition of claim 7, wherein the one or more catalysts comprise a salt of a transition metal, an alkali metal, an alkaline earth metal, a post transition metal or a metalloid.

9. The composition according to claim 7 wherein the one or more catalysts are present in an amount of about 0.0005 to about 5.0 percent by weight based on the amount of the one or more polymers, the one or more copolymers and the one or more thermoplastic elastomers present.

10. The composition according to claim 1 wherein the one or more copolymers are copolymers of one or more cyclic (meth)acrylates and/or one or more alkyl (meth)acrylates and, optionally, one or more unsaturated acids.

11. The composition according to claim 1 wherein the one or more thermoplastic elastomers containing one or more nucleophilic groups comprise one or more of polyetheramides, styrenic block copolymers, acrylic block copolymers, thermoplastic polyurethanes and thermoplastic copolyesters.

12. The composition according to claim 1 wherein the one or more polymers having one or more electrophilic groups comprise one or more of (meth)acrylic copolymers, styrene-glycidyl methacrylate copolymers, olefin-(meth)acrylic ester-glycidyl (meth)acrylate terpolymers, and olefin-glycidyl (meth)acrylate copolymers.

13. The composition of claim 1, wherein the one or more thermoplastic elastomers containing one or more nucleophilic groups comprises a polyetheramide, thermoplastic polyurethane, or thermoplastic copolyester.

14. The composition claim 13, wherein the one or more thermoplastic elastomers comprises a polyetheramide.

15. The composition of claim 1, wherein the one or more copolymers containing one or more nucleophilic groups comprises a cyclic(meth)acrylate present in the at least one copolymer in an amount of at least about 20% by weight of the at least one copolymer.

16. The composition of claim 15, wherein the cyclic (meth)acrylate esters is represented by:

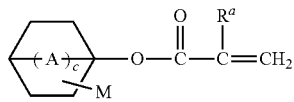

wherein $R^a$ is separately in each occurrence H or —CH3;
A is separately in each occurrence —CH2-, —CH(CH3)- or —C(CH3)2-;
one or more M is separately hydrogen, halogen, alkyl or alkylamino group, alkoxy group or a plurality thereof; and
c is 0 or 1.

17. A composition comprising:
a) one or more copolymers of i) one or more vinyl or vinylidene aromatic monomers and/or (meth)acrylates; with ii) one or more unsaturated compounds containing one or more nucleophilic groups wherein the one or more copolymers contains on average about 0.01 to about 5.0 percent by weight of the one or more nucleophilic groups based on the weight of the copolymer, the one or more copolymers having a Tg of greater than 100° C.;
b) one or more thermoplastic elastomers containing one or more nucleophilic groups; and
c) one or more polymers containing one or more electrophilic groups;
wherein at least a portion of the one or more nucleophilic groups of the one or more copolymers containing nucleophilic groups and at least a portion of the one or more nucleophilic groups of the one or more thermoplastic elastomers containing one or more nucleophilic groups are bonded to at least a portion of the one or more electrophilic groups of the one or more polymers containing one or more electrophilic groups.

18. A method of preparing the composition of claim 17 comprising:
contacting
about 20 to about 99 percent by weight of a) the one or more copolymers containing one or more nucleophilic groups;
about 1 to about 80 percent by weight of b) the one or more thermoplastic elastomers containing one or more nucleophilic groups; and,
about 0.01 to about 25 percent by weight of c) the one or more polymers having one or more electrophilic groups;
at a temperature of about 200° C. to about 300° C. for a time period of about 0.5 to about 5 minutes; such that at least a portion the one or more nucleophilic groups of the one or more copolymers containing one or more nucleophilic groups and at least a portion of the one or more nucleophilic groups of the one or more thermoplastic elastomers containing one or more nucleophilic groups are bonded to at least a portion the one or more electrophilic groups of the one or more polymers having electrophilic groups.

19. The method of claim 18, wherein the one or more copolymers containing one or more nucleophilic groups, the one or more thermoplastic elastomers containing one or more nucleophilic groups, and the one or more polymers containing one or more electrophilic groups are contacted in the presence of a catalyst for the reaction of the one or more nucleophilic groups with the one or more electrophilic groups.

20. The method of claim 19 wherein the catalyst for the reaction of the one or more nucleophilic groups with the one or more electrophilic groups comprises one or more of a salt of a transition metal, an alkali metal, an alkaline earth metal, a post transition metal or a metalloid.

* * * * *